US012649313B2

(12) United States Patent
Yamakawa

(10) Patent No.: US 12,649,313 B2
(45) Date of Patent: Jun. 9, 2026

(54) INKJET RECORDING DEVICE, AND DATA TRANSFER SYSTEM AND DATA TRANSFER METHOD INCLUDING THE INKJET RECORDING DEVICE

(71) Applicant: KEYENCE CORPORATION, Osaka (JP)

(72) Inventor: Hideki Yamakawa, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 139 days.

(21) Appl. No.: 18/639,327

(22) Filed: Apr. 18, 2024

(65) Prior Publication Data

US 2024/0351338 A1 Oct. 24, 2024

(30) Foreign Application Priority Data

Apr. 24, 2023 (JP) ................................ 2023-070744

(51) Int. Cl.
*B41J 2/175* (2006.01)
*B41J 2/045* (2006.01)
(Continued)

(52) U.S. Cl.
CPC ......... *B41J 2/1752* (2013.01); *B41J 2/04536* (2013.01); *B41J 2/04563* (2013.01); *B41J 2/04571* (2013.01); *B41J 2/085* (2013.01); *B41J 2/16517* (2013.01); *B41J 2/1742* (2024.05); *B41J 2/17596* (2013.01); *B41J 2/211* (2013.01);
(Continued)

(58) Field of Classification Search
CPC .. B41J 2/1752; B41J 2/04536; B41J 2/04563; B41J 2/04571; B41J 2/085; B41J 2/16517; B41J 2/1742; B41J 2/17596; B41J 2/211; B41J 11/009; B41J 29/393; B41J 2029/3937; B41J 2/08; B41J 2/09; B41J 2/185
See application file for complete search history.

(56) References Cited

U.S. PATENT DOCUMENTS 11,298,943 B2 4/2022 Kitamura et al.
11,842,087 B2 12/2023 Hamada
(Continued)

FOREIGN PATENT DOCUMENTS

JP 2022-26363 A 2/2022

*Primary Examiner* — Jannelle M Lebron
(74) *Attorney, Agent, or Firm* — WHDA, LLP

(57) ABSTRACT

Internal data contributing to trouble resolving is easily acquired, and usability is improved. An inkjet recording device includes an operating state acquisition unit that acquires parameter values indicating an operating state of the inkjet recording device, which includes at least one a pressurization state, a charge state, a deflection state, and a recovery state, a display unit that displays a reception screen for receiving a command to generate a two-dimensional code from a user, and a code generation unit that generates the two-dimensional code by encoding a parameter value constituting a parameter set of a predefined type among the parameter values acquired by the operating state acquisition unit when the generation command is received via the reception screen of the display unit. The display unit is configured to display the two-dimensional code generated by the code generation unit.

12 Claims, 20 Drawing Sheets

(51) Int. Cl.

| | |
|---|---|
| ***B41J 2/085*** | (2006.01) |
| ***B41J 2/165*** | (2006.01) |
| ***B41J 2/17*** | (2006.01) |
| ***B41J 2/21*** | (2006.01) |
| ***B41J 11/00*** | (2006.01) |
| ***B41J 29/393*** | (2006.01) |

(52) U.S. Cl.
CPC ........... *B41J 11/009* (2013.01); *B41J 29/393* (2013.01); *B41J 2029/3937* (2013.01)

(56) References Cited

U.S. PATENT DOCUMENTS

2022/0250377 A1* 8/2022 Arima ........................ B41J 2/18
2023/0202170 A1* 6/2023 Baldwin .................. B41J 2/125
347/14

* cited by examiner

FIG. 11A

| Object | SPECIFIC TARGET | PARAMETER SET |
|---|---|---|
| 1 | WHETHER OR NOT INTERNAL STATE IS APPROPRIATE ? | ·DATA ACQUISITION DATE AND TIME<br>·INTERNAL TANK LEVEL<br>·CURRENT OPERATING STATE (STOP, PRINTABLE, AND START-UP)<br>·CUMULATIVE NUMBER OF TIMES OF PRINTING<br>·INK PARTICLE CHARGE AMOUNT (CURRENT VALUE)<br>·INK CHARGING PHASE (CURRENT VALUE)<br>·PIEZOELECTRIC VOLTAGE FOR FORMING INK INTO PARTICLES (CURRENT VALUE)<br>·INK VISCOSITY (CURRENT VALUE)<br>·INK TEMPERATURE (CURRENT VALUE)<br>·INK PRESSURE (CURRENT VALUE)<br>·INK PARTICLE CHARGE AMOUNT (MOST RECENT LOG)<br>·INK CHARGING PHASE (MOST RECENT LOG)<br>·PIEZOELECTRIC VOLTAGE FOR FORMING INK INTO PARTICLES (MOST RECENT LOG)<br>·INK VISCOSITY (MOST RECENT LOG)<br>·INK TEMPERATURE (MOST RECENT LOG)<br>·GUTTER SENSOR MEASUREMENT RESULT (CURRENT VALUE)<br>202A(202) |
| 2 | WHETHER OR NOT DECREASE IN SOLVENT IS APPROPRIATE ? | ·2023/01/16 SOLVENT REMAINING AMOUNT 4% PUMP CUMULATIVE OPERATING 8912h HEAD CLEANING<br>·2023/01/04 SOLVENT REMAINING AMOUNT 8% PUMP CUMULATIVE OPERATING 8870h SOLVENT SHAFT ADJUSTMENT<br>·2022/12/20 SOLVENT REMAINING AMOUNT 12% PUMP CUMULATIVE OPERATING 8850h START-UP<br>·2022/12/20 SOLVENT REMAINING AMOUNT 15% PUMP CUMULATIVE OPERATING 8841h SHUT-DOWN<br>·2022/12/20 SOLVENT REMAINING AMOUNT 18% PUMP CUMULATIVE OPERATING 8830h START-UP<br>·2022/12/18 SOLVENT REMAINING AMOUNT 20% PUMP CUMULATIVE OPERATING 8825h NOZZLE CLEANING<br>·2022/12/15 SOLVENT CARTRIDGE REPLACEMENT SERIAL ******<br>⋮<br>202B(202) |
| 3 | WHETHER OR NOT VARIOUS SETTINGS ARE APPROPRIATE ? | ·SETTING OF CHARACTER PRINTING DIRECTION<br>·LINE SPEED SETTING<br>·PRINT START TRIGGER SETTING<br>·PRINT CHARACTER STRING<br>⋮<br>202C(202) |

FIG. 11B

| Object | SPECIFIC TARGET | PARAMETER SET |
| --- | --- | --- |
| 4 | IS PRINTING ENVIRONMENT APPROPRIATE ? | ·2023/1/15 PRESSURE 250kPa VISCOSITY 900 ENVIRONMENTAL TEMPERATURE 40°C<br>·2023/1/4 PRESSURE 251kPa VISCOSITY 890 ENVIRONMENTAL TEMPERATURE 26.5°C<br>·2022/12/20 PRESSURE 245kPa VISCOSITY 900 ENVIRONMENTAL TEMPERATURE 25°C<br>·2022/12/18 PRESSURE 250kPa VISCOSITY 880 ENVIRONMENTAL TEMPERATURE 26°C<br>·2022/12/15 PRESSURE 260kPa VISCOSITY 950 ENVIRONMENTAL TEMPERATURE 25°C<br>·2022/12/18 PRESSURE 250kPa VISCOSITY 1000 ENVIRONMENTAL TEMPERATURE 24°C<br>·2022/12/15 PRESSURE 230kPa VISCOSITY 900 ENVIRONMENTAL TEMPERATURE 25°C<br>:<br>:<br>:<br>202D(202) |
| 5 | WHETHER OR NOT OPERATION STATE IS APPROPRIATE ? | ·2023/1/4 MAINTENANCE: SOLVENT SHAFT ADJUSTMENT<br>·2023/1/2 MAINTENANCE: INK SHAFT ADJUSTMENT<br>·2022/12/21 ERROR : NOZZLE CLOGGING ERROR<br>·2022/12/20 MAINTENANCE: START-UP<br>·2022/12/20 MAINTENANCE: SHUT-DOWN<br>·2022/12/20 ERROR : DEFLECTION ELECTRODE LEAK ERROR<br>·2022/12/20 MAINTENANCE: START-UP<br>·2022/12/18 MAINTENANCE: NOZZLE CLEANING<br>:<br>:<br>202E(202) |

FIG. 11C

| DATA No. | INK CHARGING PHASE | |
|---|---|---|
| | WHEN VALUE IS BAD | WHEN VALUE IS GOOD |
| 1 | 4 | 6 |
| 2 | 6 | 6 |
| 3 | 4 | 6 |
| 4 | 5 | 6 |
| 5 | 6 | 6 |
| 6 | 6 | 6 |
| 7 | 7 | 6 |
| 8 | 8 | 7 |
| 9 | 5 | 6 |
| 10 | 8 | 6 |
| MOST RECENT VARIATION VALUE | 1.89 | 0.09 |

INKJET RECORDING DEVICE, AND DATA TRANSFER SYSTEM AND DATA TRANSFER METHOD INCLUDING THE INKJET RECORDING DEVICE

CROSS-REFERENCE TO RELATED APPLICATIONS

The present application claims foreign priority based on Japanese Patent Application No. 2023-070744, filed Apr. 24, 2023, the contents of which are incorporated herein by reference.

BACKGROUND OF THE INVENTION

1. Technical Field

The disclosure relates to an inkjet recording device, a data transfer system including the inkjet recording device, and a data transfer method.

2. Description of the Related Art

In the related art, an inkjet recording device for performing printing on various printing objects is known.

For example, JP2022-26363A discloses a so-called continuous inkjet recording device in which ink (ink liquid) is circulated inside the device even when printing is not performed on a workpiece.

Incidentally, in the inkjet recording device (hereinafter, simply referred to as “device”) as described in JP2022-26363A, various types of adjustment are required to perform optimum printing, such as pressure adjustment in an ejection mechanism that pressurizes ink, adjustment of a charging voltage in a charging electrode that charges ink, adjustment of a deflection voltage in a deflection electrode that deflects a flying direction of ink, and viscosity adjustment of ink by a solvent.

Since these types of adjustment need to be performed in consideration of the use environment of the device (for example, environmental temperature), a type of a printing object, and the like, these types of adjustment are not easy for a user who is unfamiliar with the use of the device.

Thus, in a case where desired printing is not realized due to some trouble, the user often makes an inquiry to a so-called support center and consults a countermeasure for realizing the desired printing.

In this case, it is possible to smoothly resolve the trouble as long as there is internal data indicating a current state and a past state of the device. However, in order to obtain such internal data, it is necessary to cause a user of the device to execute a complicated operation. However, as described above, it is not easy to cause the user who is unfamiliar with the use of the device to execute a complicated operation.

Therefore, in recent years, for the purpose of improving user convenience for obtaining the internal data of the device, for example, it has been considered that a USB memory storing a macro program is inserted into the device or remotely connected to the device via an external network such as the Internet. In this case, information contributing to trouble resolving is automatically read from the device without executing a complicated operation by the user.

However, for the sake of security, some users may prohibit the device from being directly connected to the USB memory, the external network, or the like. In this case, after all, a person in charge of the support center needs to directly give an instruction to the user by using an email, a telephone, or the like, and cause the user to execute a complicated operation as in the case of the related art. When time and effort of the user are considered, such a current situation is inconvenient.

SUMMARY OF THE INVENTION

The disclosure has been made in view of such a point, and an object of the disclosure is to easily acquire internal data contributing to trouble resolving without impairing security and improve usability.

A first aspect of the disclosure relates to an inkjet recording device including an ink tank that stores ink, an ejection mechanism that pressurizes ink sent out from the ink tank to form the ink into particulate ink, and ejects the particulate ink, a charging electrode that charges the particulate ink ejected by the ejection mechanism, a deflection electrode that deflects a flying direction of the ink charged by the charging electrode, and a gutter that recovers the ink not deflected by the deflection electrode. Printing is performed by causing the ink deflected by the deflection electrode to land on a printing object.

Then, according to the first aspect, the inkjet recording device includes an operating state acquisition unit that acquires parameter values indicating an operating state of the inkjet recording device, which includes at least one a pressurization state in the ejection mechanism, a charge state in the charging electrode, a deflection state in the deflection electrode, and a recovery state of the gutter, a display unit that displays a reception screen for receiving a command to generate a two-dimensional code from a user, and a code generation unit that generates the two-dimensional code by encoding a parameter value constituting a parameter set of a predefined type among the parameter values acquired by the operating state acquisition unit when the generation command is received via the reception screen of the display unit. The display unit is configured to display the two-dimensional code generated by the code generation unit.

According to the first aspect, the user can easily acquire the internal data of the inkjet recording device only by giving the command to generate the two-dimensional code on the reception screen (for example, operating the GUI on the screen) without executing a complicated operation.

In addition, the internal data of the device can be transmitted only by capturing the two-dimensional code with a smartphone or the like and sending the captured content to a support center through e-mail or the like without directly connecting a USB memory, an external network, or the like to the inkjet recording device. As a result, it is possible to achieve both security and usability improvement.

In particular, since not all the parameter values but the parameter value of the “parameter set of the predefined type” are encoded, internal data contributing to the trouble resolving can be easily acquired, and it is advantageous for improvement in usability.

In addition, according to a second aspect of the disclosure, the code generation unit may generate the two-dimensional code by encoding the parameter value constituting the parameter set of the predefined type together with access information for accessing a predetermined server on the Internet.

According to the second aspect, the user can transmit the internal data (parameter value) to a predetermined server by capturing and decoding the two-dimensional code by using a portable communication terminal such as a smartphone and accessing the server by using access information (for example, URL) acquired by the decoding without executing a complicated operation. This is effective in easily acquiring internal data contributing to trouble resolving and improving usability.

In addition, since not all the parameter values but the parameter value of the "parameter set of the predefined type" are narrowed down and encoded at the time of transmitting the internal data, it is advantageous in keeping the entire data amount of the parameter value within a data amount limit (for example, 255 characters) of the URL used for communication in the portable communication terminal. As a result, the internal data contributing to trouble resolving can be easily sent to the predetermined server. This contributes to improvement in usability.

In addition, according to a third aspect of the disclosure, the inkjet recording device may further include a storage unit that stores any one of a plurality of different parameter sets in association with each of a plurality of objects for receiving a plurality of different generation commands from the user. The display unit may display the plurality of objects on the reception screen, and the code generation unit may receive the generation command by receiving selection of any one of the plurality of objects via the reception screen, and generate the two-dimensional code by encoding a parameter value of the parameter set corresponding to one object stored in the storage unit and selected via the reception screen when the generation command is received.

According to the third aspect, for example, the parameter set is defined in advance in accordance with a type of the assumed trouble, and thus, more appropriate internal data (useful for resolving the trouble) can be more easily acquired in accordance with the content of the occurred trouble.

In addition, according to a fourth aspect of the disclosure, the inkjet recording device may further include a log data generation unit that generates log data by logging the parameter values indicating the operating state of the inkjet recording device in chronical order. The code generation unit may include the log data generated by the log data generation unit in the parameter value constituting the parameter set of the predefined type.

According to the fourth aspect, the log data is included in the parameter value, and thus, it is possible to determine a temporal change or the like of the parameter value. Accordingly, it is advantageous for resolving the trouble.

In addition, according to a fifth aspect of the disclosure, the inkjet recording device may further include a solvent supply unit that supplies a solvent to the ink tank. The operating state of the inkjet recording device further may include a supply state in the solvent supply unit.

According to the fifth aspect, the supply state is included in the operating state, and thus, it is possible to cope with the trouble specific to the inkjet recording device. As a result, it is advantageous for resolving the trouble.

In addition, according to a sixth aspect of the disclosure, the solvent supply unit may include a housing member that houses a solvent, a supply path that connects the housing member and the ink tank to supply the solvent to the ink tank from the housing member, and a pump that is disposed in the middle of the supply path to send the solvent within the housing member to the ink tank. The supply state in the solvent supply unit may include a remaining amount of the solvent in the housing member and an operating state of the pump.

According to the sixth aspect, the remaining amount of the solvent and the operating state of the pump are included in the operating state, and thus, it is possible to cope with the trouble specific to the inkjet recording device. As a result, it is advantageous for resolving the trouble.

In addition, according to a seventh aspect of the disclosure, the inkjet recording device may further include a solvent supply unit that supplies a solvent to the ink tank, and a cleaning operation unit that cleans the ejection mechanism by the solvent supplied from the solvent supply unit. The operating state of the inkjet recording device may further include a supply state in the solvent supply unit and a cleaning history of the cleaning operation unit.

According to the seventh aspect, the solvent supply state and the cleaning history of the cleaning operation unit are included in the operating state, and thus, it is possible to cope with the trouble specific to the inkjet recording device. As a result, it is advantageous for resolving the trouble.

In addition, according to an eighth aspect of the disclosure, the inkjet recording device may further include a solvent supply unit that supplies a solvent to the ink tank, and a viscosity measurement unit that measures a viscosity of the ink within the ink tank. The operating state of the inkjet recording device may include the viscosity of the ink measured by the viscosity measurement unit.

According to the eighth aspect, the viscosity of the ink in the ink tank is included in the operating state, and thus, it is possible to cope with the trouble specific to the inkjet recording device. As a result, it is advantageous for resolving the trouble.

In addition, according to a ninth aspect of the disclosure, the inkjet recording device may further include a temperature measurement unit that measures a temperature of the ink within the ink tank. The operating state of the inkjet recording device may include the temperature of the ink measured by the temperature measurement unit.

According to the ninth aspect, the temperature of the ink in the ink tank is included in the operating state, and thus, it is possible to cope with the trouble specific to the inkjet recording device. As a result, it is advantageous for resolving the trouble.

In addition, according to a tenth aspect of the disclosure, the code generation unit may generate one or a plurality of two-dimensional codes in accordance with a data amount of the parameter set of the predefined type.

According to the tenth aspect, even in a case where the data amount of the parameter set is relatively large, it is possible to generate the two-dimensional code without delay. As a result, it is advantageous in easily acquiring the internal data contributing to the trouble resolving and improving the usability of the device.

In addition, an eleventh aspect of the disclosure relates to a data transfer system including the inkjet recording device, a portable communication terminal, and a server that is connected to the portable communication terminal via the Internet. An operating state of the inkjet recording device acquired by the operating state acquisition unit is transferred to the server via the portable communication terminal.

Then, according to the eleventh aspect, in the data transfer system, the code generation unit of the inkjet recording device generates a two-dimensional code by encoding access information for accessing the server in addition to a parameter value constituting the parameter set of the predefined type, the portable communication terminal includes a capturing unit that captures the two-dimensional code displayed on the display unit of the inkjet recording device and encoded together with the access information, a decoding unit that acquires the operating state of the inkjet recording device corresponding to the two-dimensional code by decoding the two-dimensional code captured by the capturing unit, and an upload unit that uploads the operating state acquired by the decoding unit to the server specified by the access information, and the server includes a retention unit that retains the operating state uploaded by the upload unit.

According to the eleventh aspect, it is possible to cause the server to easily acquire the internal data contributing to trouble resolving without impairing security. This is effective for improving usability.

In addition, a twelfth aspect of the disclosure relates to a data transfer method for transferring, to a server connected to a portable communication terminal via the Internet, an operating state of the inkjet recording device, which is acquired by the operating state acquisition unit, via the portable communication terminal by using the inkjet recording device, the portable communication terminal, and the server.

Then, according to the twelfth aspect, the data transfer method includes a step of generating, by the code generation unit of the inkjet recording device, a two-dimensional code by encoding a parameter value constituting the parameter set of the predefined type together with access information for accessing the server, a step of capturing, by the portable communication terminal, the two-dimensional code displayed on the display unit of the inkjet recording device and encoded together with the access information, a step of acquiring the operating state of the inkjet recording device corresponding to the two-dimensional code by decoding the captured two-dimensional code, a step of uploading, by the portable communication terminal, the operating state acquired by decoding the two-dimensional code to the server specified by the access information, and a step of retaining, by the server, the operating state uploaded by the portable communication terminal.

According to the twelfth aspect, it is possible to cause the server to easily acquire the internal data contributing to trouble resolving without impairing security. This is effective for improving usability.

As described above, according to the disclosure, it is possible to easily acquire the internal data contributing to the trouble resolving and improve the usability without impairing security.

BRIEF DESCRIPTION OF THE DRAWINGS

FIG. 11A is a diagram illustrating a parameter set associated with each object;

FIG. 11B is a diagram illustrating the parameter set associated with each object;

FIG. 11C is a diagram illustrating a parameter value related to a charge amount;

DETAILED DESCRIPTION

Hereinafter, embodiments of the disclosure will be described with reference to the drawings. Note that, the following description is an example.

That is, in the present specification, an industrial inkjet printer will be described as an example of an inkjet recording device, but a technology disclosed herein can be applied to a general device configured to cause particulate ink to fly and land on a printing object such as a workpiece regardless of names of the inkjet recording device and the industrial inkjet printer.

In addition, in the present specification, printing by the inkjet recording device will be described, but the "printing" referred to herein includes all type of machining processing to which inkjet is applied, such as printing of characters and marking of figures.

Overall Configuration

Figure 1:
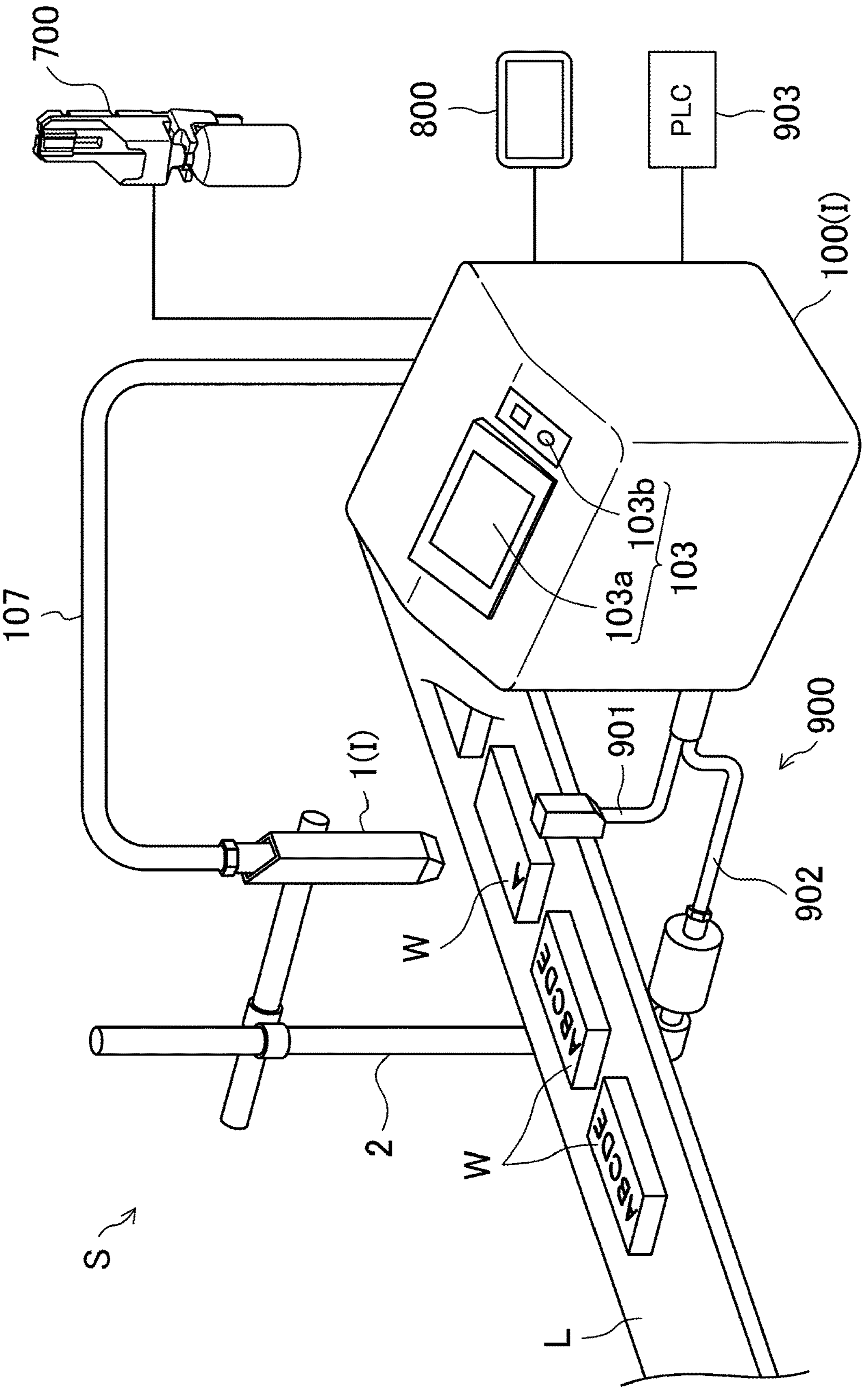
FIG. 1 is a diagram illustrating an overall configuration of an inkjet recording system.
Figure 2:
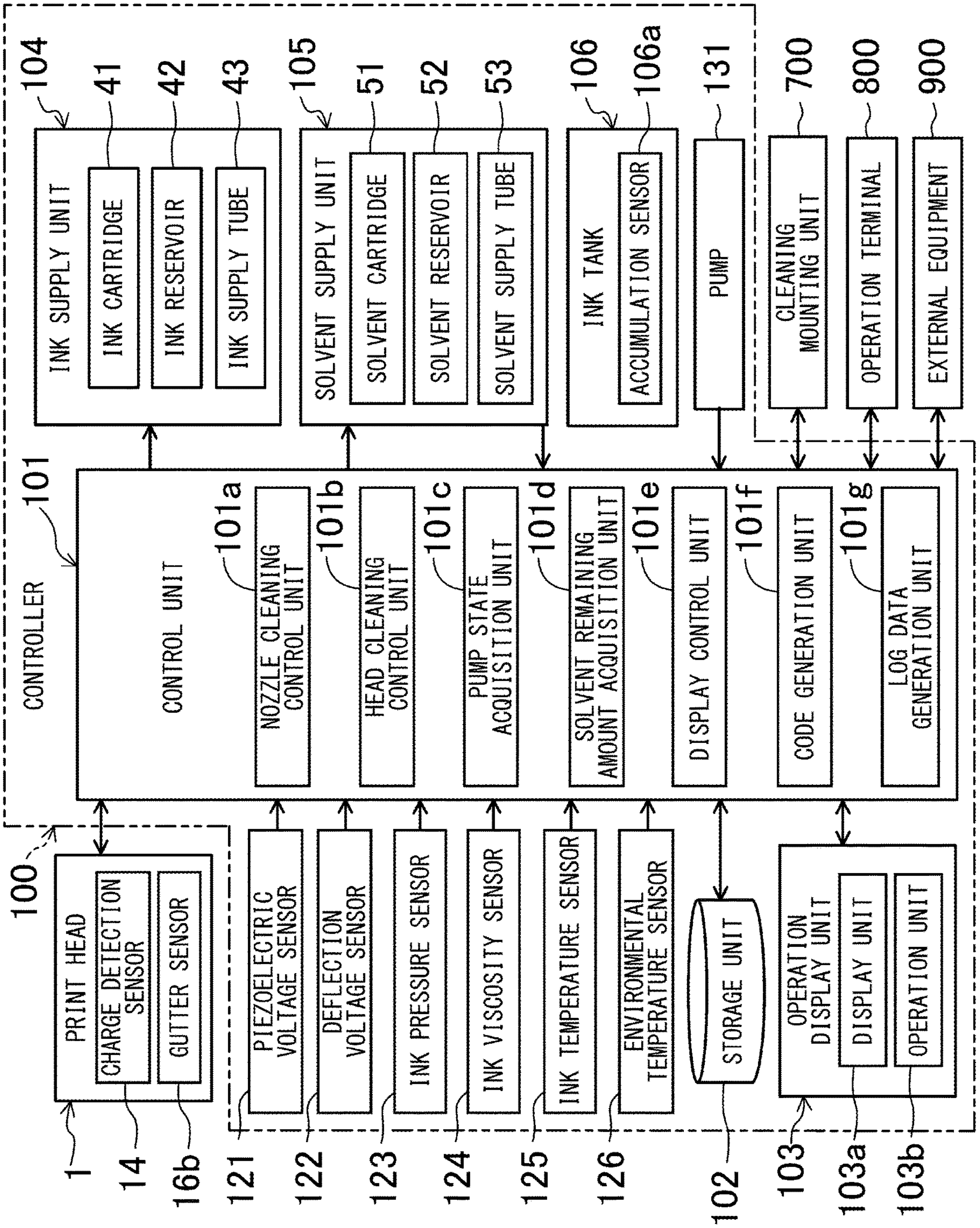
FIG. 2 is a block diagram illustrating a schematic configuration of the inkjet recording device.
Figure 3:
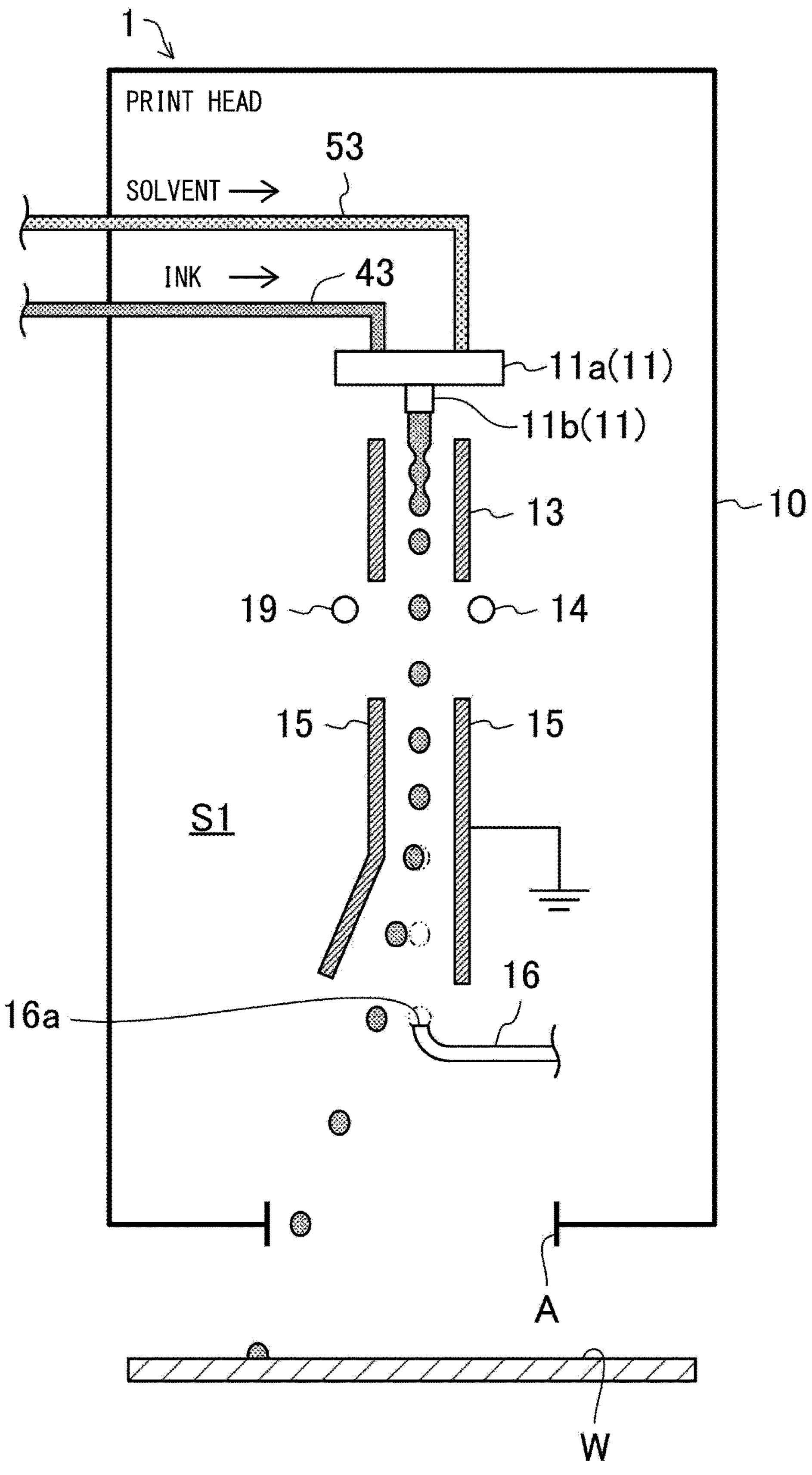
FIG. 3 is a diagram illustrating a schematic configuration of a print head.
Figure 4A:
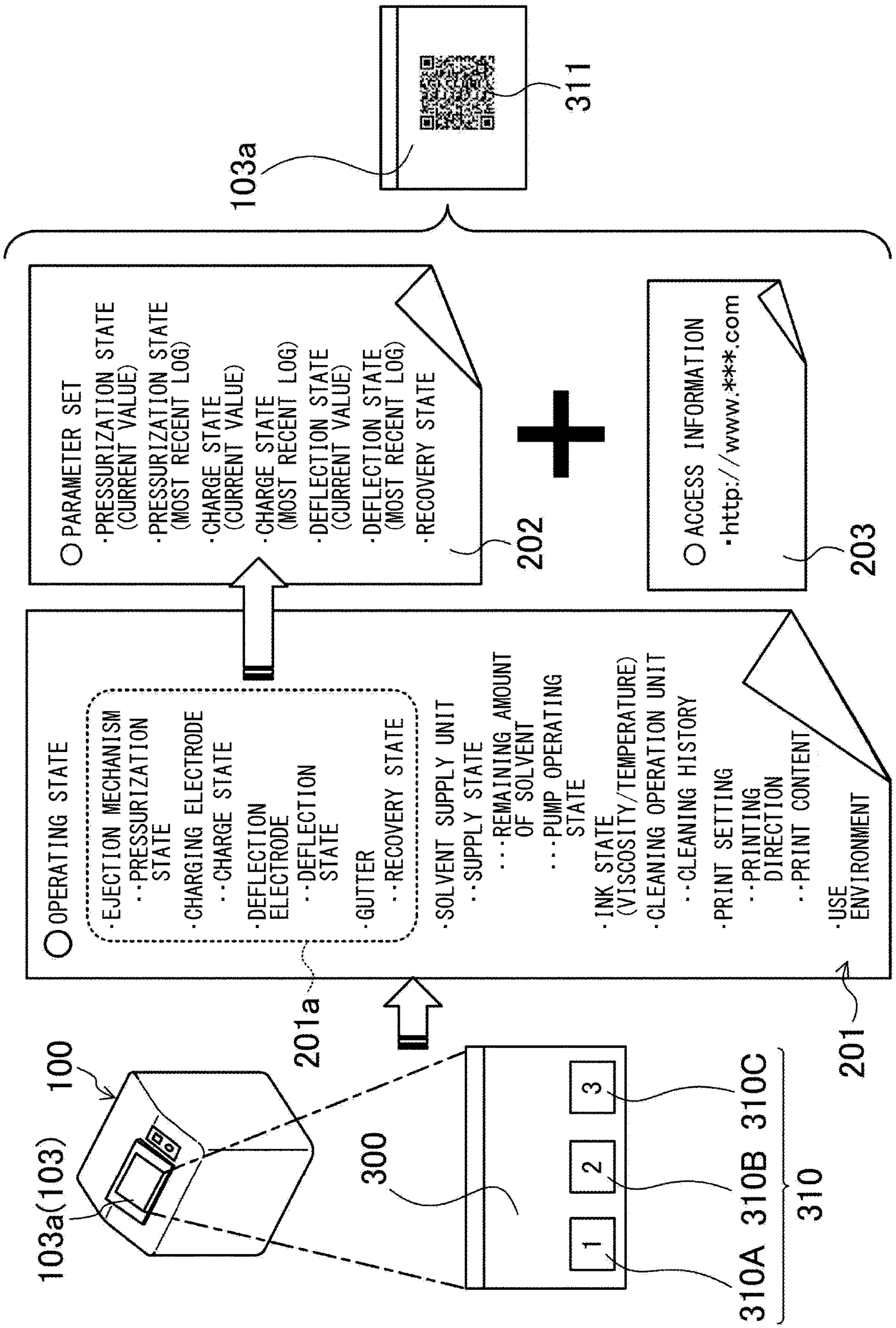
FIG. 4A is a diagram for describing a basic concept of processing related to a two-dimensional code.
Figure 4B:
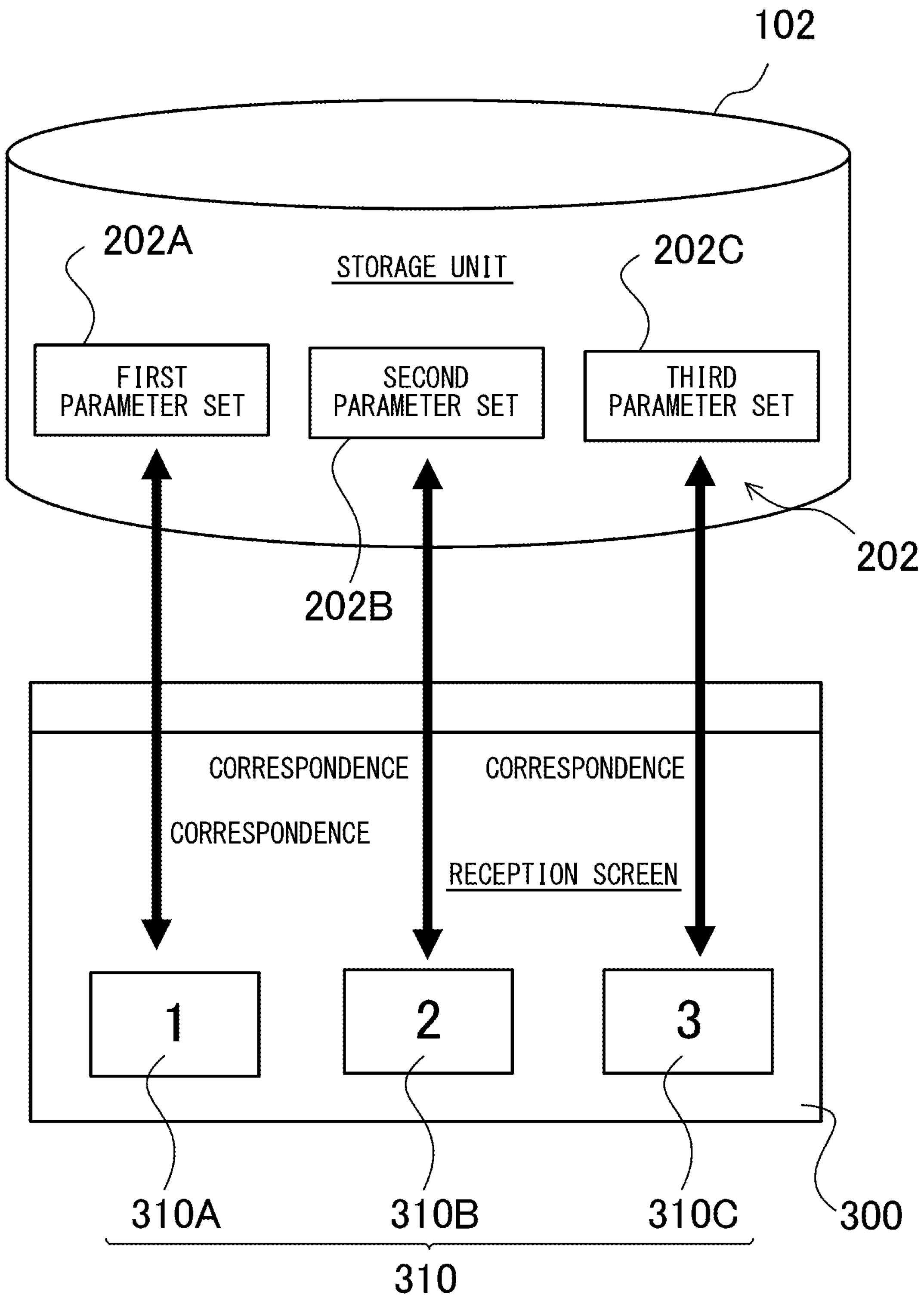
FIG. 4B is a diagram for describing a correspondence relationship between an object and a parameter set.

FIG. 1 is a diagram illustrating an overall configuration of an inkjet recording system S. In addition, FIG. 2 is a diagram illustrating a schematic configuration of an inkjet recording device I, and FIG. 3 is a diagram illustrating a schematic configuration of a print head 1 in the inkjet recording device I. Then, FIG. 4A is a diagram illustrating a path of ink and a solvent in the inkjet recording device I, and FIG. 4B is a diagram for describing a correspondence relationship between objects 310 and a parameter set 202. The inkjet recording system S illustrated in FIG. 1 is installed in, for example, a conveyance line L of a factory or the like, and is configured to sequentially perform printing on printing objects W flowing through the conveyance line L. Note that, an application target of the disclosure is not limited to the inkjet recording system S. The invention can be applied to a printing system using a method other than an automatic method. The conveyance line L can include, for example, a belt conveyor or the like.

Note that, the inkjet recording system S and the inkjet recording device I illustrated in FIG. 1 can also be used for constructing a data transfer system T to be described later (see FIG. 14).

Specifically, the inkjet recording system S includes the inkjet recording device I that performs printing by causing particulate ink (ink particles) to land on a printing object W, a cleaning mounting unit 700 that is connected to the inkjet recording device I to clean the print head 1, and an operation terminal 800 and external equipment 900 that are connected to the inkjet recording device I. Note that, the operation terminal 800 and the external equipment 900 are not essential.

The inkjet recording device I illustrated in FIGS. 1 to 3 includes the print head 1 that ejects ink particles from a nozzle 11*b* and causes the ink particles to land on the printing object W, and a controller 100 that supplies a control signal, ink, and a solvent to the print head 1. The controller 100 supplies a control signal to the print head 1 to control a trajectory of the ink particles. As a result, a landing position of the ink particles on the printing object W is adjusted, and desired printing is realized. The print head 1 is fixed at a predetermined position by a support member 2 or the like.

The inkjet recording device I is a continuous inkjet printer (CIJ). That is, in order to prevent clogging (in particular, clogging of the nozzle 11*b*) and the like due to volatilization of the ink, even though the inkjet recording device I is not executing printing, the ink constantly circulates inside the inkjet recording device I as long as the inkjet recording device I is in an operating state. The continuous type is adopted, and thus, a quick-drying ink can be used without causing clogging by the ink.

In addition, the inkjet recording device I according to the present embodiment can clean each part of the print head 1 such as the nozzle 11*b* by sending out a solvent to the print head 1. The solvent used in the cleaning can be recovered as necessary and can be reused to adjust a concentration (viscosity) of the ink.

In order to realize the circulation of the ink, the print head 1 includes a gutter 16 that recovers the ink or the solvent ejected from the nozzle 11*b* in addition to the nozzle 11*b* that ejects the ink or the solvent (see FIG. 3). The ink or solvent fed from the controller 100 to the print head 1 is ejected from the nozzle 11*b* and is recovered by the gutter 16. The ink or solvent recovered in this manner is sent back to the controller 100 to be reused. Such steps are repeated, and thus, the ink can be circulated.

On the other hand, the operation terminal 800 includes, for example, a central processing unit (CPU) and a storage device, and is connected to the controller 100. The operation terminal 800 defines print settings and functions as a terminal for indicating information related to printing to the user.

The print settings set by the operation terminal 800 are output to the controller 100 and are stored in a storage unit 102. In addition to the storage unit 102 of the controller 100 or instead of the storage unit 102, the operation terminal 800 may store the print settings.

Note that, the print settings according to the present embodiment may include one or more of a content such as a character string to be printed, a printing direction of the character string, and information related to a print trigger to be described later.

Note that, for example, the operation terminal 800 can be incorporated in and integrated with the controller 100. In this case, the term "control unit" or the like is used instead of the term "operation terminal".

The external equipment 900 is connected to the controller 100 as necessary. In the example illustrated in FIGS. 1 and 2, a workpiece detection sensor 901, a conveyance speed sensor 902, and a programmable logic controller (PLC) 903 are provided as the external equipment 900.

Specifically, the workpiece detection sensor 901 detects the presence or absence of the printing object W in the conveyance line L, and outputs a signal (detection signal) indicating the detection result to the controller 100. The detection signal output from the workpiece detection sensor 901 functions as a trigger (print trigger) for starting printing.

The conveyance speed sensor 902 includes, for example, a rotary encoder, and can detect a conveyance speed of the printing object W. The conveyance speed sensor 902 outputs a signal (detection signal) indicating the detection result to the controller 100. The controller 100 controls a timing and the like of ejecting the ink particles from the print head 1 based on the detection signal input from the conveyance speed sensor 902.

In addition, as illustrated in FIG. 2, the PLC 903 is electrically connected to the controller 100. The PLC 903 is used to control the inkjet recording system S according to a predetermined sequence.

In addition to the equipment and device described above, a device for performing operation and control, a computer for performing other various types of processing, a storage device, a peripheral device, and the like can be connected to the inkjet recording device I. The connection method in this case may be either wired connection or wireless connection.

Controller 100

The controller 100 is configured to electrically control the print head I and supply printing ink and a solvent for diluting the ink to the print head 1.

Specifically, the controller 100 according to the present embodiment includes, as components related to electrical control, the storage unit 102 that stores the above-described print settings, a control unit 101 that controls the controller 100 and each part of the print head 1, and an operation display unit 103 that receives an operation by the user and displays information to the user.

The controller 100 further includes an ink supply unit 104, a solvent supply unit 105, and an ink tank 106 as components related to supply of ink and the like. These components are in direct or indirect fluid connection with the print head 1.

The ink supply unit 104 includes an ink reservoir 42 that detachably receives an ink cartridge 41 in which ink is housed. Meanwhile, the solvent supply unit 105 includes a solvent reservoir 52 that detachably receives a solvent cartridge 51 in which a solvent is housed. Although related to a blowing control to be described later, the ink reservoir 42 can also receive an empty solvent cartridge 51.

In addition, the ink tank 106 stores, as printing ink, the ink from the ink cartridge 41 received in the ink reservoir 42 and the solvent from the solvent cartridge 51 received in the solvent reservoir 52. The "printing ink" referred to herein means a mixture of the solvent and the ink (for example, ink whose concentration is adjusted by the solvent).

Then, the print head 1 performs printing with the printing ink from the ink tank 106. The print head I also cleans the nozzle 11*b* and the like with the solvent supplied from the solvent supply unit 105 while bypassing the ink tank 106.

The control unit 101, the ink supply unit 104, and the solvent supply unit 105 may be separate units. The storage unit 102 may also be a separate unit from the ink supply unit 104 and the solvent supply unit 105. The operation display unit 103 may also be a separate unit from the ink supply unit 104 and the solvent supply unit 105. In these cases, the components can also be combined into the controller 100.

In addition, a case where the ink supply unit 104 and the ink tank 106 are regarded as independent components is merely a classification for the sake of convenience. From the viewpoint of being related to the supply of ink, the ink tank 106 may be regarded as an element of the ink supply unit 104.

(Storage Unit 102)

The storage unit 102 is configured to store the print settings set via the operation display unit 103 or the operation terminal 800 to be described later, and output the stored print settings to the control unit 101 based on a control signal from an outside.

Specifically, the storage unit 102 includes a volatile memory, a nonvolatile memory, a solid state drive (SSD), a hard disk drive (HDD), or the like, and can temporarily or continuously store information indicating the print settings. Note that, in a case where the operation terminal 800 is incorporated in the controller 100, the operation terminal 800 may also serve as the storage unit 102.

(Control Unit 101)

The control unit 101 controls at least the ink supply unit 104 and the solvent supply unit 105 in the controller 100 and the nozzle 11*b*, a charging electrode 13, and a deflection electrode 15 in the print head I based on the print settings stored in the storage unit 102. Each unit is controlled by the control unit 101, and thus, printing on the printing object W is performed at a predetermined timing.

Specifically, the control unit 101 includes, for example, a CPU, a memory, an input and output bus, and the like, and generates a control signal based on a signal indicating information input via the operation display unit 103 or the operation terminal 800 and a signal indicating a print setting read from the storage unit 102. The control unit 101 controls printing on the printing object W by outputting the control signal generated in this manner to the controller 100 and each unit of the inkjet recording device I.

For example, when printing is performed on the printing object W, the control unit 101 reads a print content on the printing object W stored in the storage unit 102 and generates a control signal based on the print content. Then, the control unit 101 sets a flying direction of the ink particles to realize a landing position corresponding to the print content by outputting the control signal to the charging electrode 13.

-Other Functional Elements in Control Unit 101-

In addition, the control unit 101 according to the present embodiment includes a nozzle cleaning control unit 101*a*, a head cleaning control unit 101*b*, a code generation unit 101*f*, a log data generation unit 101*g*, and the like. Details of these elements will be described later.

(Operation Display Unit 103)

As illustrated in FIG. 1, the operation display unit 103 includes a display unit 103*a* that displays information to the user and an operation unit 103*b* that receives an operation by the user. The operation display unit 103 can be provided in, for example, a housing or the like constituting the controller 100, but may be formed separately from the housing and may be set at a location different from the housing. In addition, in a case where the operation terminal 800 is incorporated in the controller 100, the operation terminal 800 may also serve as the operation display unit 103.

The display unit 103*a* displays various types of information related to the inkjet recording device I. The display unit 103*a* includes, for example, a liquid crystal display panel, an organic EL display panel, or the like, and changes a display aspect in response to a control signal from the control unit 101. The display unit 103*a* can display a user interface for operating each unit of the inkjet recording system S, or display a user interface for setting print settings, and a reception screen 300 related to two-dimensional code generation control to be described later.

The operation unit 103*b* includes, for example, a touch operation panel, a button, a switch, and the like. When the user operates the operation unit 103*b*, information (operation information) corresponding to the operation input is input to the control unit 101, and the control unit 101 can detect which operation has been performed. For example, the operation unit 103*b* is operated, and thus, it is possible to switch power ON or OFF and the like of the inkjet recording device I, and to perform various settings, input information, and the like.

The operation display unit 103 can also set print settings similarly to the operation terminal 800 described above. The print settings set by the operation display unit 103 are output to the controller 100 and are stored in the storage unit 102. In the following description, it is assumed that the user operates the operation display unit 103, but the operation terminal 800 may be used instead of the operation display unit 103.

(Ink Supply Unit 104)

The ink supply unit 104 supplies, as the printing ink, the ink from the ink cartridge 41 to the nozzle 11*b* of the print head 1. At this time, the ink from the ink supply unit 104 is supplied to the print head 1 via the ink tank 106.

Specifically, the ink supply unit 104 according to the present embodiment includes, as main components, the ink cartridge 41 and the ink reservoir 42 described above, and an ink supply tube 43. The ink supply tube 43 fluidly connects the ink cartridge 41 and the print head 1. The ink tank 106 is disposed in the middle of the ink supply tube 43 from the ink cartridge 41 to the print head 1.

Among these components, the ink cartridge 41 houses ink. The ink reservoir 42 detachably receives the ink cartridge 41. The ink cartridge 41 is replaced with respect to the ink reservoir 42, and thus, ink can be replenished to the ink tank 106. That is, the inkjet recording device I according to the present embodiment is a so-called "cartridge type" inkjet printer.

The ink supply tube 43 constitutes a path for supplying the printing ink to the print head 1. Ink can be circulated between the print head 1 and the controller 100 by a path constituted by the ink supply tube 43.

In addition, a plurality of opening and closing valves and a plurality of pumps are provided in the ink supply tube 43. Among these components, each opening and closing valve is an electromagnetic valve. Each opening and closing valve can be opened and closed in response to a control signal output from the control unit 101 to control a flow of ink. On the other hand, each pump receives a control signal output from the control unit 101 to pressure-feed the ink, and can control the flow of the ink similarly to the opening and closing valve. Note that, at least a part of the opening and closing valves may be a manual cock instead of the electromagnetic valve.

(Solvent Supply Unit 105)

The solvent supply unit 105 supplies the solvent from the solvent cartridge 51 to the ink tank 106 similarly to the ink, or supplies the solvent alone to the nozzle 11*b*. The former solvent forms the printing ink together with the ink by adjusting a density of the ink, and is supplied to the print head 1.

Here, in a case where the printing ink is formed together with the ink (that is, in a case where printing is performed on the print head 1), the solvent from the solvent supply unit 105 is guided to the nozzle 11*b* through the ink tank 106. On the other hand, in a case where the solvent is supplied alone (that is, in a case where the nozzle 11*b* is cleaned), the solvent from the solvent supply unit 105 is guided to the nozzle 11*b* without passing through the ink tank 106.

Specifically, the solvent supply unit 105 according to the present embodiment includes, as main components, the solvent cartridge 51 and the solvent reservoir 52 described above, and a solvent supply tube 53. The solvent supply tube 53 fluidly connects the solvent cartridge 51 and the print head 1 to the solvent cartridge 51 and the ink tank 106, respectively.

Among these components, the solvent cartridge 51 houses the solvent. The solvent reservoir 52 detachably receives the solvent cartridge 51. The solvent cartridge 51 is replaced with respect to the solvent reservoir 52, and thus, it is possible to replenish the solvent for concentration adjustment and the solvent for cleaning. That is, the inkjet recording device I according to the present embodiment is also a “cartridge type” inkjet printer for the solvent. The solvent cartridge 51 is an example of a “housing member” in the present embodiment. Note that, the housing member is not limited to the solvent cartridge 51. The “solvent tank” in a so-called tank-type inkjet printer may be the “housing member” according to the disclosure.

The solvent supply tube 53 constitutes a path for supplying the solvent from the solvent cartridge 51 to the ink tank 106 or supplying the solvent from the solvent cartridge 51 to the print head 1 without interposing the ink tank 106. By the path, the printing ink can be generated from the ink and the solvent, or the print head I can be cleaned with the solvent. The solvent supply tube 53 is an example of a “supply path” in the present embodiment.

Note that, the classification of the ink supply tube 43 and the solvent supply tube 53 is merely a classification for the sake of convenience made to simplify the description. The ink supply tube 43 and the solvent supply tube 53 are substantially inseparable because these tubes are connected to each other or one tube serves as the other tube.

In addition, a plurality of opening and closing valves and a plurality of pumps 131 (pumps 131 are illustrated only in FIG. 2) are provided in the solvent supply tube 53. Among these components, each opening and closing valve is an electromagnetic valve. Each opening and closing valve can be opened and closed in response to a control signal output from the control unit 101 to control a flow of the solvent. On the other hand, each pump 131 receives a control signal output from the control unit 101, pumps the solvent, and can control the flow of the solvent similarly to the electromagnetic valve. Note that, as described above, a manual cock may be used instead of the electromagnetic valve.

In particular, each pump 131 according to the present embodiment is disposed in the middle of the solvent supply tube 53 as a supply path. Each pump 131 sends the solvent within the solvent cartridge 51 as the housing member to the ink tank 106 by controlling the flow of the solvent as described above.

(Ink Tank 106)

The ink tank 106 is configured to store the ink from the ink cartridge 41 and the solvent from the solvent cartridge 51. Specifically, the ink tank 106 is a container that houses ink whose concentration (viscosity) is adjusted by the solvent, that is, a mixture of the ink and the solvent.

The printing ink supplied from the ink tank 106 to the nozzle 11*b* lands on a surface of the printing object W at the time of printing, and is collected by the gutter 16 and is sent back to the ink tank 106 at the time of non-printing. As a result, the circulation of the printing ink is realized.

In addition, the solvent supplied to the nozzle 11*b* for cleaning is also collected by the gutter 16, and is then sent to the ink tank 106 through, for example, a conditioning tank (not illustrated) dedicated to the solvent, and can be reused for the concentration adjustment of the ink.

In addition, an accumulation sensor 106*a* for detecting a level (so-called liquid level) in the tank is provided in the ink tank 106. The accumulation sensor 106*a* is electrically connected to the control unit 101, and inputs a detection signal thereof to the controller 100. The accumulation sensor 106*a* may be an electrode type level sensor, a float type level sensor, or a capacitance type level sensor.

(Other Components)

A connection cable 107 in which a power supply wire for transmitting and receiving the control signal, a tube (specifically, a tube constituting the ink supply tube 43) for transmitting and receiving the ink, and a tube (specifically, a tube constituting the solvent supply tube 53) for transmitting and receiving the solvent are covered in a bundle are provided in the controller 100. This connection cable 107 is flexible and is connected to an upper end of the print head 1 (see FIG. 1). The controller 100 and the print head I are electrically and fluidly connected via this connection cable 107.

Print Head 1

The print head 1 ejects, as the particulate ink, the ink (printing ink) whose density is adjusted based on the control signal supplied from the controller 100, the ink, and the solvent. The print head I can execute printing on the printing object W by deflecting the flying direction of the ink ejected in this manner and causing the deflected ink to land on the surface of the printing object W. The details of printing at this time are in accordance with the above-described printing settings. The print head I can sequentially perform printing on each of the printing objects W according to the printing settings.

Specifically, as illustrated in FIG. 3, the print head 1 according to the present embodiment includes an ejection mechanism 11 that pressurizes the ink sent out from the ink tank 106 to form the ink into particulate ink and ejects the particulate ink, the charging electrode 13 that charges particulate printing ink ejected from the nozzle 11*b* of the ejection mechanism 11, the deflection electrode 15 that deflects the flying direction of the printing ink charged by the charging electrode 13, the gutter 16 that recovers the printing ink not deflected by the deflection electrode 15 or the solvent ejected from the nozzle 11*b*, and a cleaning nozzle 19. The inkjet recording device I according to the present embodiment performs printing by causing the ink deflected by the deflection electrode 15 to land on the printing object.

In addition, as elements related to acquisition of various parameter values, the print head 1 includes a charge detection sensor 14 that monitors a charge state of the printing ink, and a gutter sensor 16*b* that detects whether or not the ink is in the gutter 16.

The print head 1 includes a housing 10 that houses the ejection mechanism 11, the charging electrode 13, the charge detection sensor 14, the deflection electrode 15, the gutter 16, the gutter sensor 16*b*, and the cleaning nozzle 19 therein and defines a flying space S1 of the ink particles. The print head I can eject the ink particles deflected by the deflection electrode 15 to an outside of the housing 10 through the flying space S1.

An ejection port A for ejecting the ink particles deflected by the deflection electrode 15 to the outside is opened on a lower surface of the housing 10 forming an outer shape of the print head 1 (see FIG. 3). The ink particles are ejected from the ejection port A toward a lower side of the housing 10.

As illustrated in FIG. 1, the print head I at the time of printing is supported by, for example, the support member 2. The print head 1 in a state of being supported by the support member 2 is disposed such that the ejection port A faces a printing surface of the printing object W from above. This location is an example of an installation location of the print head 1 when printing is performed by the inkjet recording device I.

Hereinafter, each unit constituting the print head I will be described in order. Note that, in the following description, "upward and downward directions" refer to directions along a vertical direction. For example, an upper side of a paper surface of FIG. 3 corresponds to the "upward direction", and a lower side of the ground in FIG. 3 corresponds to the "downward direction".

(Ejection Mechanism 11)

As illustrated in FIG. 3, the ejection mechanism 11 is disposed near an upper end of the flying space S1 of the housing 10. The printing ink is supplied to the ejection mechanism 11 from the ink tank 106 via the connection cable 107. The ejection mechanism 11 is configured to pressurize the printing ink sent out from the ink tank 106 to form the printing ink into particulate ink, and eject the particulate ink.

Specifically, the ejection mechanism 11 includes a pressurizer (vibration unit) **11*a* and the nozzle 11*b*. The pressurizer 11*a* is configured to pressurize an ink liquid supplied from the ink tank 106 or the like. Note that, although not illustrated, the pressurizer 11*a* according to the present embodiment is grounded. A pressure of the ink realized by the pressurizer 11*a* can be detected by an ink pressure sensor 123**.

The nozzle **11*b* is connected to a lower end of the pressurizer 11*a*, and is disposed in a posture with an opening end thereof (a spray port of the printing ink) facing downward. The nozzle 11*b* includes a piezoelectric device (for example, a piezoelectric element) that applies vertical vibration to the ink, and applies the vertical vibration to the ink pressurized by the pressurizer 11*a* and then ejects the ink from the ejection port. Due to this vibration, the ink liquid ejected from the nozzle 11*b*** is formed into particles after a predetermined time from an ejection timing thereof.

Here, the printing ink ejected from the ejection mechanism 11 with no applied vibration (without being vibrated) flows in a so-called "ink shaft" of a shaft shape. On the other hand, the printing ink ejected from the ejection mechanism 11 with applied vibration (with being vibrated) is formed into particles immediately after being ejected from the nozzle **11*b*, and becomes so-called "Ink particles". The printing ink ejected from the nozzle 11*b* has a shaft shape immediately after being ejected from the nozzle 11*b*, but becomes particulate ink as being separated from the nozzle 11*b*. A position where the printing ink becomes the particulate ink is referred to as a breakpoint. The printing ink (ink particles) ejected from the nozzle 11*b* passes through the charging electrode 13** to be described later.

Note that, the solvent supplied to clean the print head 1 passes through the pressurizer **11*a* and the nozzle 11*b* in order and is ejected from a tip of the nozzle 11*b*. The solvent ejected in this manner flows in a shaft shape and passes through the charging electrode 13**.

Note that, in a case where the nozzle **11*b* includes the piezoelectric device, the formation of the ink into the particles can be controlled through a voltage (hereinafter, also referred to as a "piezoelectric voltage") applied to the piezoelectric device. In the present embodiment, the controller 100 is configured to apply a controllable piezoelectric voltage to the piezoelectric device of the nozzle 11*b*.**

(Charging Electrode 13)

As illustrated in FIG. 3, the charging electrode 13 includes a pair of conductive metal plates, and is disposed below the nozzle **11*b*. Here, the pair of metal plates constituting the charging electrode 13 is fixed to the housing 10 in a posture in which longitudinal directions thereof are aligned with the upward and downward directions and in a posture in which the metal plates face each other in a horizontal direction. An interval between the pair of metal plates is set to be larger than a particle diameter of the ink ejected from the nozzle 11*b* of the ejection mechanism 11, and the printing ink ejected from the nozzle 11*b* passes between the pair of metal plates. Note that, the pair of metal plates constituting the charging electrode 13** need not be provided.

A potential (positive potential) is applied to the charging electrode 13 according to the present embodiment at least when a printing operation is executed. As a result, a potential difference is generated between the ejection mechanism 11 (in particular, the pressurizer **11*a*) and the charging electrode 13, and the ink particles passing through the charging electrode 13 can be charged. In order to charge each ink particle, the charging electrode 13 according to the present embodiment is disposed near the breakpoint where the printing ink ejected from the nozzle 11*b*** is formed into the particles.

A pulse potential that can be controlled by the controller 100 is applied to the charging electrode 13. Here, in a case where a relatively high voltage is applied to the charging electrode 13, the charge amount (magnitude of negative charge) of each ink particle becomes larger than in a case where a lower voltage is applied. In a case where the charge amount of each ink particle is large, the ink particle is greatly deflected by the deflection electrode 15 as compared with in a case where the charge amount is small. The controller 100 can control the deflection amount of the ink particles by adjusting the magnitude of the pulse potential. The ink particles charged by the charging electrode 13 reach the deflection electrode 15 having passed through a side of the charge detection sensor 14.

In addition, the solvent ejected from the nozzle **11*b* passes through the side of the charge detection sensor 14 without being charged and reaches the deflection electrode 15**.

(Charge Detection Sensor 14)

As illustrated in FIG. 3, the charge detection sensor 14 is disposed below the charging electrode 13. Specifically, the charge detection sensor 14 is disposed below the metal plate (in the example illustrated in FIG. 3, the metal plate on a right side of the paper surface) constituting the charging electrode 13 not to cross a trajectory when the ink particles fly. The charge detection sensor 14 is disposed in this manner, and thus, it is possible to avoid collision between the ink particles and the charge detection sensor 14.

In addition, the charge detection sensor 14 according to the present embodiment is connected to a circuit board provided inside the housing 10. The charge detection sensor 14 can detect a charge state of the ink particle (in particular, the charge amount of each ink particle) passing through the side. A detection result by the charge detection sensor 14 is output, as a detection signal, to the control unit 101. The control unit 101 can determine whether or not each ink particle is appropriately charged based on this detection signal.

The charge detection sensor 14 can acquire a parameter value indicating a charge state in the charging electrode 13 (a value of the charge amount of each ink particle) among parameter values indicating an operating state of the inkjet recording device I. The charge detection sensor 14 can be regarded as an example of an "operating state acquisition unit" according to the present embodiment.

Note that, the charge detection sensor 14 according to the present embodiment is used to determine a timing at which the ink particles are changed via the charging electrode 13. Specifically, first, a plurality of types of pulse potentials having the same frequency as the signal (the above-described piezoelectric voltage) applied to the piezoelectric device provided in the nozzle 11*b* and having a "phase" deviated from the signal are applied to the charging electrode 13, and thus, the printing ink formed into the particles is charged. The control unit 101 can acquire a value of the phase based on the detection signal of the charge detection sensor 14. The control unit 101 controls the phase of the pulse potential such that the charge amount of the ink particles is maximized. Hereinafter, this phase is also referred to as an "ink charging phase".

A current value of the ink charging phase can be classified into a parameter value indicating the charge state in the charging electrode 13 among the parameter values indicating the operating state of the inkjet recording device I. The charge detection sensor 14 can be regarded as an example of the "operating state acquisition unit" according to the present embodiment also in that the charge detection sensor 14 can be used for acquiring the ink charging phase.

(Deflection Electrode 15)

As illustrated in FIG. 3, the deflection electrode 15 includes a pair of conductive metal plates (so-called "counter electrodes"), and is disposed below the charging electrode 13 and the charge detection sensor 14. Here, the pair of metal plates is fixed to the housing 10 in a posture in which the longitudinal directions thereof are substantially along the vertical direction and in a posture in which the pair of metal plates face each other in the horizontal direction. The ink particles having passed between the pair of metal plates constituting the charging electrode 13 pass between the pair of metal plates constituting the deflection electrode 15.

A voltage (hereinafter, also referred to as "deflection voltage") that can be controlled by the controller 100 is applied to the deflection electrode 15. As a result, a potential difference corresponding to the deflection voltage is generated between the pair of metal plates constituting the deflection electrode 15. Due to this potential difference, the flying direction of the ink particles can be deflected in accordance with the charge amount of the ink particles. The flying direction of the ink particles can be deflected along an arrangement direction of the pair of metal plates constituting the deflection electrode 15.

That is, the flying direction of the ink particles can be controlled via the deflection voltage applied to each of the charging electrode 13 and the deflection electrode 15. The ink particles whose flying direction is controlled in this manner include particles deflected by the deflection electrode 15 and particles not deflected by the deflection electrode 15 (particles not deflected). Among these particles, the ink particles deflected by the deflection electrode 15 are involved in the printing of the printing object W. The ink particles deflected by the deflection electrode 15 are ejected from the ejection port A provided on the lower surface of the housing 10 to land on the printing object W.

On the other hand, the ink particles not deflected by the deflection electrode 15 are not involved in the printing of the printing object W. Such ink particles or the shaft-shaped printing ink that is not formed into the particles reach the inside of the gutter 16 as illustrated by a chain line in FIG. 3. Similarly, the solvent used for cleaning the nozzle 11*b* and the like in the print head 1 and having passed through the deflection electrode 15 also reaches the inside of the gutter 16.

(Gutter 16)

As illustrated in FIG. 3, the gutter 16 is a curved pipe having an opening 16*a* facing upward, and is disposed below the deflection electrode 15. The gutter 16 according to the present embodiment can recover the printing ink that is not involved in the printing of the printing object W and the solvent having passed through the nozzle 11*b* (specifically, the solvent ejected from the nozzle 11*b*).

Specifically, in the present embodiment, the opening 16*a* of the gutter 16 and an opening end of the nozzle 11*b* are disposed to face each other, and the opening end of the nozzle 11*b* is positioned directly above the opening 16*a* of the gutter 16. With this disposition, a fluid flowing along the vertical direction from the opening end of the nozzle 11*b* and the flying fluid can be received from the opening 16*a* of the gutter 16.

A charge type or thermistor type gutter sensor 16*b* is provided in the gutter 16 (sec FIG. 3). The gutter sensor 16*b* can detect whether or not the printing ink is in the gutter 16, can determine that the adjustment of the ink shaft is completed when the printing ink is in the gutter 16, and can determine that the adjustment of the ink shaft is not completed when the printing ink is not in the gutter 16. The gutter sensor 16*b* is connected to the control unit 101 of the controller 100, and is configured to output a signal to the control unit 101.

The printing ink or solvent recovered by the gutter 16 is sent back to the controller 100 through the ink supply tube 43, the solvent supply tube 53, and the like, and is stored in the ink tank 106.

The gutter sensor 16*b* can acquire a parameter value indicating a recovery state in the gutter 16 (a parameter value indicating whether or not the ink is in the gutter 16) among the parameter values indicating the operating state of the inkjet recording device I. The gutter sensor 16*b* can be regarded as an example of the "operating state acquisition unit" according to the present embodiment.

(Cleaning Nozzle 19)

As illustrated in FIG. 3, the cleaning nozzle 19 is provided within the print head 1. The cleaning nozzle 19 functions as a so-called solvent spray unit. The cleaning nozzle 19 is a nozzle for cleaning the ejection mechanism 11, the charging electrode 13, the deflection electrode 15, and the like in the print head 1 by spraying the solvent thereto, and can spray the solvent as a cleaning liquid.

Piezoelectric Voltage Sensor 121

As illustrated in FIG. 2, the inkjet recording device I includes a piezoelectric voltage sensor 121 that detects the piezoelectric voltage described above. The piezoelectric voltage sensor 121 is disposed, for example, in the middle of an electrical path connecting a piezoelectric voltage generation source built in the controller 100 and the ejection mechanism 11. The piezoelectric voltage sensor 121 may be built in the controller 100 or may be built in the print head 1.

The piezoelectric voltage sensor 121 is electrically connected to the control unit 101 of the controller 100, and inputs an electric signal corresponding to the detected value (parameter value) to the control unit 101. The control unit 101 acquires a value of the piezoelectric voltage based on the input electric signal.

The piezoelectric voltage sensor 121 can acquire a parameter value (actual measurement value of the piezoelectric voltage) indicating a pressurization state in the ejection mechanism 11 among the parameter values indicating the operating state of the inkjet recording device I. The piezoelectric voltage sensor 121 can be regarded as an example of the "operating state acquisition unit" according to the present embodiment.

Deflection Voltage Sensor 122

As illustrated in FIG. 2, the inkjet recording device I includes a deflection voltage sensor 122 that detects a deflection voltage applied to the deflection electrode 15. The deflection voltage sensor 122 is disposed, for example, in the middle of an electrical path connecting a deflection voltage generation source built in the controller 100 and the deflection electrode 15. The deflection voltage sensor 122 may be built in the controller 100 or may be built in the print head 1.

The deflection voltage sensor 122 is electrically connected to the control unit 101 of the controller 100, and inputs an electric signal corresponding to the detected value (parameter value) to the control unit 101. The control unit 101 acquires a value of the deflection voltage based on the input electric signal.

The deflection voltage sensor 122 can acquire a parameter value (actual measurement value of the deflection voltage) indicating a deflection state in the deflection electrode 15 among the parameter values indicating the operating state of the inkjet recording device I. The deflection voltage sensor **15*a*** can be regarded as an example of the "operating state acquisition unit" according to the present embodiment.

Ink Pressure Sensor 123

As illustrated in FIG. 2, the inkjet recording device I includes the ink pressure sensor 123 that detects the pressure of the ink (printing ink) pressurized by the ejection mechanism 11 described above. The ink pressure sensor 123 may be built in the controller 100 or may be built in the print head 1. The ink pressure sensor 123 is preferably built in the print head 1.

The ink pressure sensor 123 is electrically connected to the control unit 101 of the controller 100, and inputs an electric signal corresponding to the detected value (parameter value) to the control unit 101. The control unit 101 acquires a value of the pressure (ink pressure) based on an input electric signal.

The ink pressure sensor 123 can acquire a parameter value (a value of the ink pressure) indicating a pressurization state in the ejection mechanism 11 among the parameter values indicating the operating state of the inkjet recording device I. The ink pressure sensor 123 can be regarded as an example of the "operating state acquisition unit" according to the present embodiment.

Ink Viscosity Sensor 124

As illustrated in FIG. 2, the inkjet recording device I includes an ink viscosity sensor 124 that detects a viscosity of the ink in the ink tank 106. The ink viscosity sensor 124 is disposed, for example, in the middle of the ink supply tube 43. That is, the ink viscosity sensor 124 may be disposed in an ink path leading to the inside of the ink tank 106 without being provided within the ink tank 106.

The ink viscosity sensor 124 detects a flow rate of the ink or the printing ink flowing through the ink supply tube 43, and detects a viscosity (hereinafter, also referred to as an "ink viscosity") based on the flow rate. The ink viscosity sensor 124 inputs an electric signal corresponding to the detected value (parameter value) to the control unit 101. The control unit 101 acquires a viscosity value based on the input electric signal.

The value of the viscosity measured by the ink viscosity sensor 124 can be classified into a pressurization state of the ink (particularly, a viscosity state of the ink) among the parameter values indicating the operating state of the inkjet recording device I. The ink viscosity sensor 124 is an example of a "viscosity measurement unit" according to the present embodiment, and is also an example of an "operating state acquisition unit".

Note that, in the present embodiment, the ink viscosity sensor 124 having a principle of detecting an ink flow rate is used, but the disclosure is not limited thereto. For example, the ink viscosity sensor 124 that repeats filling and discharging of the ink and detects the viscosity based on a time at the time of ink discharge may be used.

Ink Temperature Sensor 125

As illustrated in FIG. 2, the inkjet recording device I includes an ink temperature sensor 125 that detects a temperature of the ink in the ink tank 106. The ink temperature sensor 125 is disposed in, for example, the middle of the ink supply tube 43. That is, the ink temperature sensor 125 may be disposed in an ink path leading to the inside of the ink tank 106 without being provided in the ink tank 106.

The ink temperature sensor 125 detects the temperature of the ink or the printing ink flowing through the ink supply tube 43 or the ink or the printing ink accumulated in the ink tank 106. The ink temperature sensor 125 inputs an electric signal corresponding to the detected value (parameter value) to the control unit 101. The control unit 101 acquires a value of the temperature based on the input electric signal.

The temperature of the ink measured by the ink temperature sensor 125 can be included in the operating state of the inkjet recording device I. The ink temperature sensor 125 is an example of a "temperature measurement unit" according to the present embodiment, and is also an example of the "operating state acquisition unit".

Environmental Temperature Sensor 126

As illustrated in FIG. 2, the inkjet recording device I includes an environmental temperature sensor 126 that detects an ambient temperature of the print head 1. The environmental temperature sensor 126 is connected to the control unit 101 of the controller 100, and is configured to output information regarding the detected temperature to the control unit 101. The environmental temperature sensor 126 may be built in the controller 100 or may be built in the print head 1. The environmental temperature sensor 126 performs temperature detection even though the power of the inkjet recording device I is turned off, and outputs the detection result to the control unit 101. The control unit 101 is configured to be able to record the temperature even though the power of the inkjet recording device I is turned off.

Cleaning Mounting Unit 700

As illustrated in FIG. 1, the cleaning mounting unit 700 is disposed at a location different from the installation location of the print head 1 when printing is performed by the inkjet recording device I. Although not illustrated, the cleaning mounting unit 700 is configured such that the print head 1 is mounted when the print head 1 is cleaned by using the cleaning liquid.

The cleaning mounting unit 700 and the print head 1 are connected to communicate with each other, and a connection form thereof may be wired or wireless. In addition, the print head 1 and the controller 100 are connected to communicate with each other, and a connection form thereof may be wired or wireless. Further, the controller 100 and the cleaning mounting unit 700 are connected to communicate with each other, and a connection form thereof may be wired or wireless. As an example of these connection forms, a signal line capable of transmitting and receiving signals can be used.

In a case where the installation location of the print head 1 when printing is performed by the inkjet recording device I is defined as illustrated in FIG. 1, the cleaning mounting unit 700 is installed at a location separated from the installation location. The cleaning mounting unit 700 can be installed separated from the controller 100, but may be installed at the same location as the controller 100. The cleaning mounting unit 700 is a unit that cleans the print head 1 in a state where the print head 1 is mounted, and can also be referred to as, for example, a cleaning station, a cleaning dock, a cleaning mounting device, a cleaning unit, or the like.

Details of Control Unit 101

FIG. 4A is a diagram for describing a basic concept of processing according to a two-dimensional code 311.

Hereinafter, referring back to the description of the controller 100, functional blocks constituting the control unit 101 will be described. As illustrated in FIG. 2, the control unit 101 includes the nozzle cleaning control unit 101*a*, the head cleaning control unit 101*b*, a pump state acquisition unit 101*c*, a solvent remaining amount acquisition unit 101*d*, a display control unit 101*c*, the code generation unit 101*f*, and the log data generation unit 101*g*.

Among these functional elements, the nozzle cleaning control unit 101*a* and the head cleaning control unit 101*b* are related to start-up processing, shut-down processing, and the like of the inkjet recording device I. However, when the start-up processing and the shut-down processing are not executed, the nozzle cleaning control unit 101*a* and the head cleaning control unit 101*b* can be caused to independently function based on the operation input of the user or the like.

The start-up processing refers to processing executed before printing is started (before transitioning to a printable state) when the power to the inkjet recording device I is turned on. In addition, the shut-down processing refers to processing executed before the operation of the inkjet recording device I is stopped (before transitioning from the printable state) when the power of the inkjet recording device I is turned off. Note that, the "printable state" referred to herein refers to a state where the ink circulates inside the controller 100 and the print head 1 and is ready to perform printing on the printing object W.

Specifically, the inkjet recording device I according to the present embodiment does not immediately start printing even though a power switch is turned on. The inkjet recording device I executes a predetermined start-up processing before starting printing. In this start-up processing, the ejection of the ink is started after the print head 1 is cleaned by using the solvent. The ink ejected immediately after the start of the start-up processing forms the ink shaft described above and is recovered by the gutter 16.

In addition, when the power switch is about to be turned off, the inkjet recording device I according to the present embodiment does not immediately stop the operation. Before stopping the operation, the inkjet recording device I executes a predetermined shut-down processing including nozzle cleaning or the like. In this shut-down processing, the solvent can be ejected from the nozzle 11*b*, and the ink remaining therein can be cleaned and recovered. The ink discharged from the nozzles 11*b* in association with the ejection of the solvent is recovered by the gutter 16 similarly to the ink shaft in the start-up processing.

Note that, the "power switch" in the present embodiment includes switches including a touch operation panel displayed on the operation display unit 103 and the like in addition to physical push buttons. Then, an OFF operation of the power switch also refers to a shutdown operation instructed through the operation terminal 800, the operation display unit 103, and the like in addition to an operation of physically pressing a push button or the like. The same applies to an ON operation of the power switch.

(Nozzle Cleaning Control Unit 101*a*)

The nozzle cleaning control unit 101*a* is configured to clean the ejection mechanism 11 with the solvent supplied from the solvent supply unit 105. Although not described in detail, the nozzle cleaning control unit 101*a* cleans and recovers the ink remaining in the ejection mechanism 11 by ejecting the solvent from the nozzle 11*b*. The ink discharged from the nozzle 11*b* accompanying the ejection of the solvent is recovered by the gutter 16. The nozzle cleaning control unit 101*a* is an example of a "cleaning operation unit" in the present embodiment.

(Head Cleaning Control Unit 101*b*)

The head cleaning control unit 101*b* is configured to clean the inside of the print head 1 with the solvent supplied from the solvent supply unit 105. Although not described in detail, the nozzle cleaning control unit 101*a* ejects the solvent from the cleaning nozzle 19 to spray the solvent from the outside to the ejection mechanism 11, the charging electrode 13, the deflection electrode 15, and the like in the print head 1, and thus, these components are cleaned. The solvent ejected from the cleaning nozzle 19 and the ink flowing down from the charging electrode 13 and the like along with the solvent are recovered by a recovery container attached to the cleaning mounting unit 700.

(Pump State Acquisition Unit 101*c*)

The pump state acquisition unit 101*c* acquires an operating state of the pump 131. Specifically, the pump state acquisition unit 101*c* includes, for example, a timer, and acquires a cumulative operating time of the pump 131.

The operating state of the pump 131 acquired by the pump state acquisition unit 101*c* can be included in the operating state of the inkjet recording device I, and can be classified into the supply state in the solvent supply unit 105.

(Solvent Remaining Amount Acquisition Unit 101*d*)

The solvent remaining amount acquisition unit 101*d* acquires the remaining amount of the solvent in the solvent cartridge 51 as the housing member. Specifically, the solvent remaining amount acquisition unit 101*d* is, for example, a timer. The solvent remaining amount acquisition unit 101*d* measures an operating time of the pump 131 and acquires the remaining amount of the solvent based on the operating time.

For example, in a case where the amount of the solvent to be removed per unit time from the solvent cartridge 51 is known, it is possible to calculate how much solvent is removed from the inside of the solvent cartridge 51 by acquiring the driving time of the pump 131 (it is also possible to calculate the remaining amount of the solvent by subtracting the amount of the solvent removed from an initial amount of the solvent). Alternatively, in a case where the amount of the solvent to be removed from the solvent cartridge 51 per one time is known, for example, a liquid level meter is provided in the ink tank 106, and the number of times the amount of the solvent within the ink tank 106 increases is measured by using the liquid level meter. Accordingly, how many times the solvent is removed from the solvent cartridge 51 is calculated. Then, the amount of the solvent removed at one time is multiplied by the number of times of removal, and thus, it is possible to calculate how much solvent is removed from the inside of the solvent cartridge 51.

The remaining amount of the solvent acquired by the solvent remaining amount acquisition unit 101*d* can be included in the operating state of the inkjet recording device I, and can be classified into the supply state in the solvent supply unit 105.

(Display Control Unit 101*e*)

The display control unit 101*e* controls the display aspect of the display unit 103*a*. The display unit 103*a* displays a reception screen 300 as illustrated in FIG. 4A in response to the control signal from the display control unit 101*e* (a specific example will be described later). The reception screen 300 is a screen for receiving a command to generate the two-dimensional code 311 from the user.

As illustrated in FIG. 4A, one or a plurality of objects 310 for giving the command to generate the two-dimensional code 311 is displayed on the reception screen 300. For example, FIG. 4A illustrates three objects 310 (first object 310A, second object 310B, and third object 310C). These objects 310 function as so-called graphical user interfaces (GUIs).

Then, when the command to generate the two-dimensional code 311 is received via the reception screen 300 of the display unit 103*a*, the code generation unit 101*f* executes predetermined two-dimensional code generation control.

Note that, a control target by the display control unit 101*e* may be a display unit other than the controller 100, such as a display unit of the operation terminal 800.

(Code Generation Unit 101*f*)

The code generation unit 101*f* executes the two-dimensional code generation control. As illustrated in FIG. 4A, the two-dimensional code generation control is to generate the two-dimensional code 311 by encoding a parameter value constituting a parameter set 202 of a predefined type among parameter values 201 acquired by the operating state acquisition unit. The two-dimensional code 311 may be, for example, a QR code (registered trademark).

Here, the "operating state acquisition unit" refers to sensors that acquire the parameter values 201 indicating the operating state of the inkjet recording device I. Further, as illustrated in FIG. 4A, an acquisition target of the parameter values by such sensors, that is, the operating state of the inkjet recording device I includes at least one of the pressurization state in the ejection mechanism 11, the charge state in the charging electrode 13, the deflection state in the deflection electrode 15, and the recovery state in the gutter 16.

Specifically, the operating state acquisition unit according to the present embodiment includes at least one of the piezoelectric voltage sensor 121, the ink pressure sensor 123, the charge detection sensor 14, the deflection voltage sensor 122, and the gutter sensor 16*b*. That is, the parameter value 201 indicating the pressurization state includes values of the piezoelectric voltage and the ink pressure. The parameter value 201 indicating the charge state includes a value of the charge amount of each ink particle and a value of the ink charging phase. The parameter value indicating the deflection state includes an actual measurement value of the deflection voltage. The parameter value 201 indicating the recovery state includes a parameter value indicating whether or not the ink is in the gutter 16.

In addition, as illustrated in FIG. 4A, the operating state of the inkjet recording device I may further include the supply state in the solvent supply unit 105. The supply state in the solvent supply unit 105 may include the remaining amount of the solvent in the housing member and the operating state of the pump 131. The remaining amount of the solvent in the housing member may be a value acquired by the solvent remaining amount acquisition unit 101*d*. The operating state of the pump 131 may be the cumulative operating time of the pump 131 acquired by the pump state acquisition unit 101*c*.

Further, as illustrated in FIG. 4A, the operating state of the inkjet recording device I may further include a cleaning history of the nozzle cleaning control unit 101*a* as the cleaning operation unit in addition to the supply state in the solvent supply unit 105. Note that, the cleaning operation unit referred to herein may be the head cleaning control unit 101*b* in addition to or instead of the nozzle cleaning control unit 101*a*. The cleaning history may be at least one of execution histories of the start-up processing and the shut-down processing, an execution history of the nozzle cleaning by the nozzle cleaning control unit 101*a*, and an execution history of the head cleaning by the head cleaning control unit 101*b*.

In addition, as illustrated in FIG. 4A, as the "operating state" in a broad sense, the operating state of the inkjet recording device I may further include a state of the ink used for printing of the printing object W. The state of the ink may be the viscosity of the ink measured by the ink viscosity sensor 124 as the viscosity measurement unit. The state of the ink may be the temperature of the ink measured by the ink temperature sensor 125 as the temperature measurement unit. Although not illustrated, the state of the ink may be a level (so-called liquid level) in the ink tank 106 detected by the accumulation sensor 106*a*. Each of the ink viscosity sensor 124, the ink temperature sensor 125, and the accumulation sensor 106*a* can be regarded as an example of the operating state acquisition unit.

In addition, as illustrated in FIG. 4A, as the "operating state" in a broad sense, the operating state of the inkjet recording device I may include printing settings such as the printing direction and the printing content.

In addition, as illustrated in FIG. 4A, as the "operating state" in a broad sense, the operating state of the inkjet recording device I may include a use environment of the device. The operating state of the inkjet recording device I may be the ambient temperature measured by the environmental temperature sensor 126.

In addition, although not illustrated, as the "operating state" in a broad sense, a serial number of the inkjet recording device I may be included in the operating state of the inkjet recording device I.

Then, the code generation unit 101*f* generates the two-dimensional code 311 by encoding the parameter value 201 constituting the parameter set 202 of the predefined type among the parameter values 201 acquired by the operating state acquisition unit.

That is, the code generation unit 101*f* is configured not to collectively encode all the parameter values 201 regarding the operating state listed as described above, but to extract and encode a part of the parameter values 201 as indicated by a broken line 201*a* in FIG. 4A.

Here, the inkjet recording device I according to the present embodiment is configured to allow the user to select the type of the parameter set 202. This selection is realized by the code generation unit 101*f*, the display unit 103*a*, and the storage unit 102.

Specifically, for example, as illustrated in FIG. 4B, the storage unit 102 stores any one of a plurality of different parameter sets 202 in association with each of a plurality of objects 310 for receiving a plurality of different generation commands from the user. Then, the display unit 103*a* displays the plurality of objects 310 on the reception screen 300 (a fourth screen 300D to be described later) based on, for example, a control signal from the display control unit 101*c*. Each object 310 functions as an "identifier" for distinguishing the parameter set 202.

In the example illustrated in FIG. 4B, as indicated by a double-headed arrow in the drawing, a first parameter set 202A is associated with a first object 310A. A second parameter set 202B is associated with a second object 310B. A third parameter set 202C is associated with a third object 310C. When n is a natural number, an "n-th parameter set" referred to herein corresponds to a parameter set 202 of an n-th type.

Note that, it is not essential to associate one object 310 with one parameter set 202, and two or more parameter sets 202 may be associated with one object 310.

The code generation unit 101*f* receives the generation command by receiving selection of any one of the plurality of objects 310 via the reception screen 300. Upon receiving the generation command, the code generation unit 101*f* generates the two-dimensional code 311 by encoding the parameter values 201 of the parameter set 202 stored in the storage unit 102 and associated with one object 310 selected via the reception screen 300.

In addition, as illustrated in FIG. 4A, the code generation unit 101*f* generates the two-dimensional code 311 by encoding the parameter value 201 constituting the parameter set 202 of the predefined type together with access information 203 for accessing a predetermined server (for example, a server 3001 in FIG. 14) on the Internet. The access information 203 may be a so-called Uniform Resource Locator (URL).

Note that, the parameter values 201 encoded by the code generation unit 101*f* are not limited to a most recent or current acquired value. The parameter values 201 encoded by the code generation unit 101*f* may be past acquired values (log data). In addition, it is not essential to incorporate the access information 203 into the two-dimensional code 311. The two-dimensional code 311 may be generated by encoding only the parameter value 201 constituting the parameter set 202 of the predefined type.

Thus, the control unit 101 according to the present embodiment includes the log data generation unit 101*g* that generates log data by logging the parameter values 201 indicating the operating state of the inkjet recording device I in chronological order. The code generation unit 101*f* includes log data ("most recent log" in FIG. 4A) generated by the log data generation unit 101*g* in the parameter value 201 constituting the parameter set 202 of the predefined type.

Then, when the two-dimensional code 311 is generated by the code generation unit 101*f*, the display control unit 101*e* displays the generated two-dimensional code 311 on the display unit 103*a*. That is, the display unit 103*a* according to the present embodiment is configured to be able to display the two-dimensional code 311 generated by the code generation unit.

Specific Example of Two-Dimensional Code Generation Control

Figure 5:
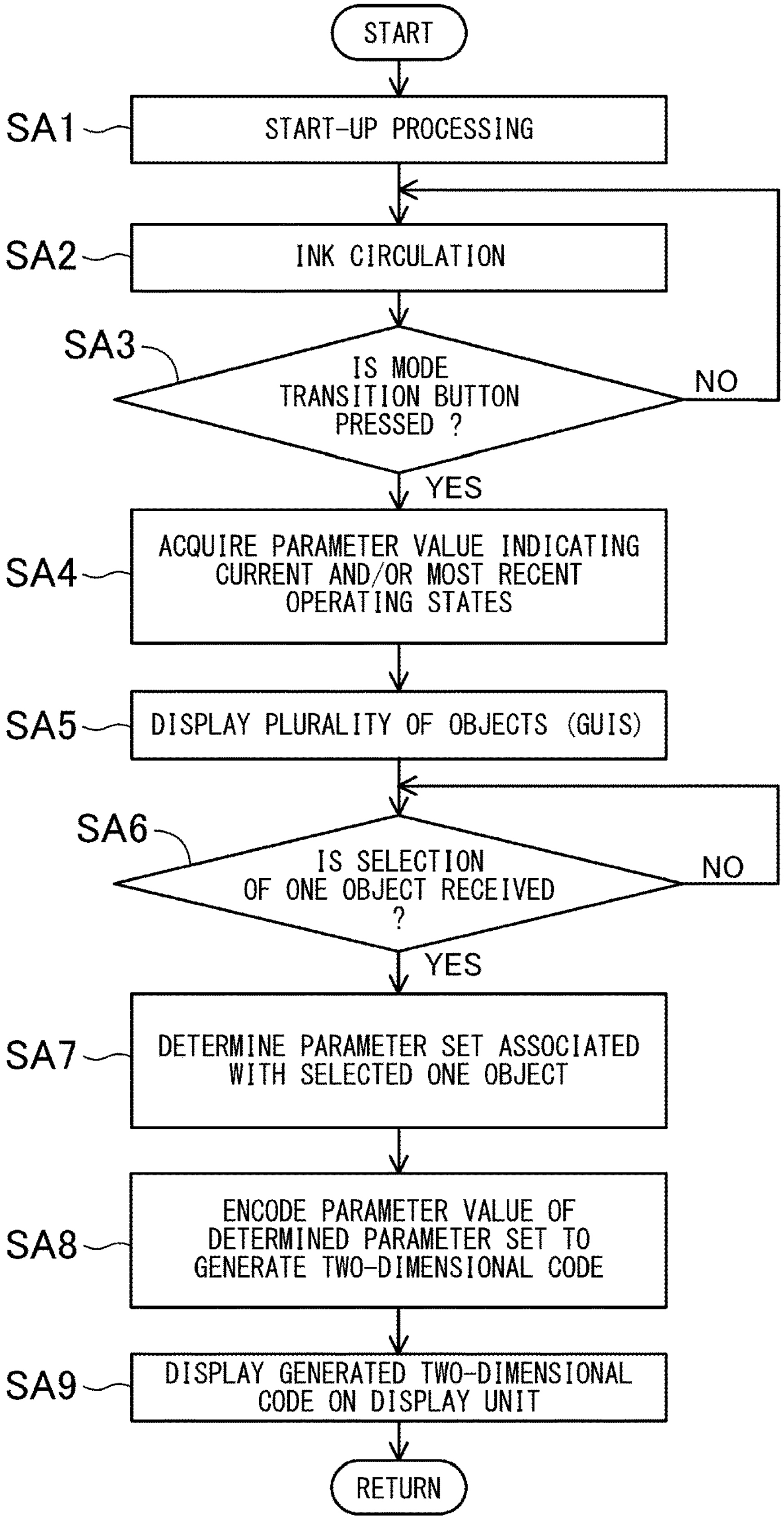
FIG. 5 is a flowchart illustrating a specific example of the processing related to the two-dimensional code.
Figure 6:
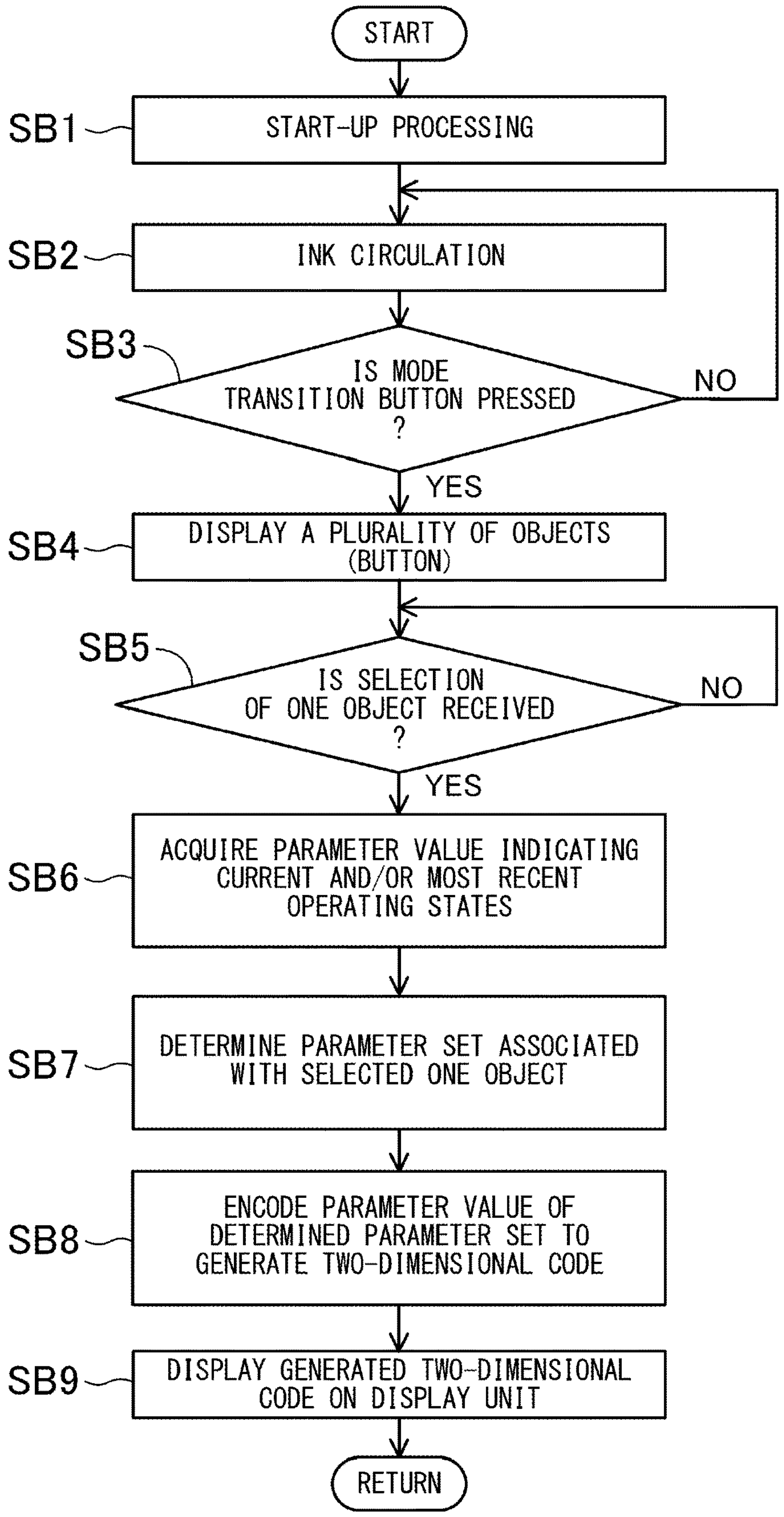
FIG. 6 is a flowchart illustrating another example of the processing related to the two-dimensional code.

Next, a specific example of the two-dimensional code generation control will be described with reference to the drawings. FIG. 5 is a flowchart illustrating a specific example of processing (two-dimensional code generation control) related to the two-dimensional code 311. FIG. 6 is a flowchart illustrating another example of the processing related to the two-dimensional code generation control.

Figure 7:
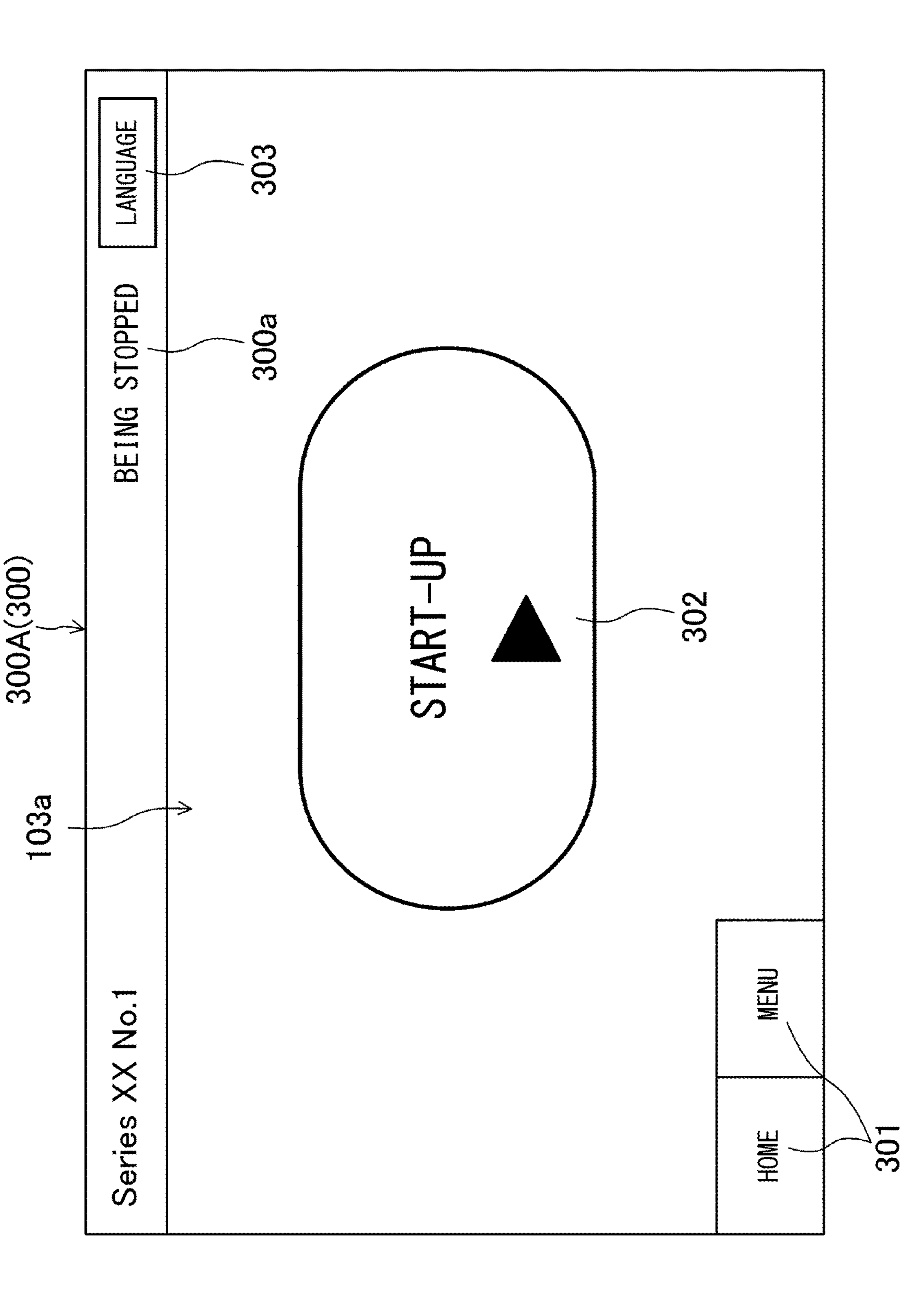
FIG. 7 is a diagram illustrating a display screen related to start-up processing.
Figure 8:
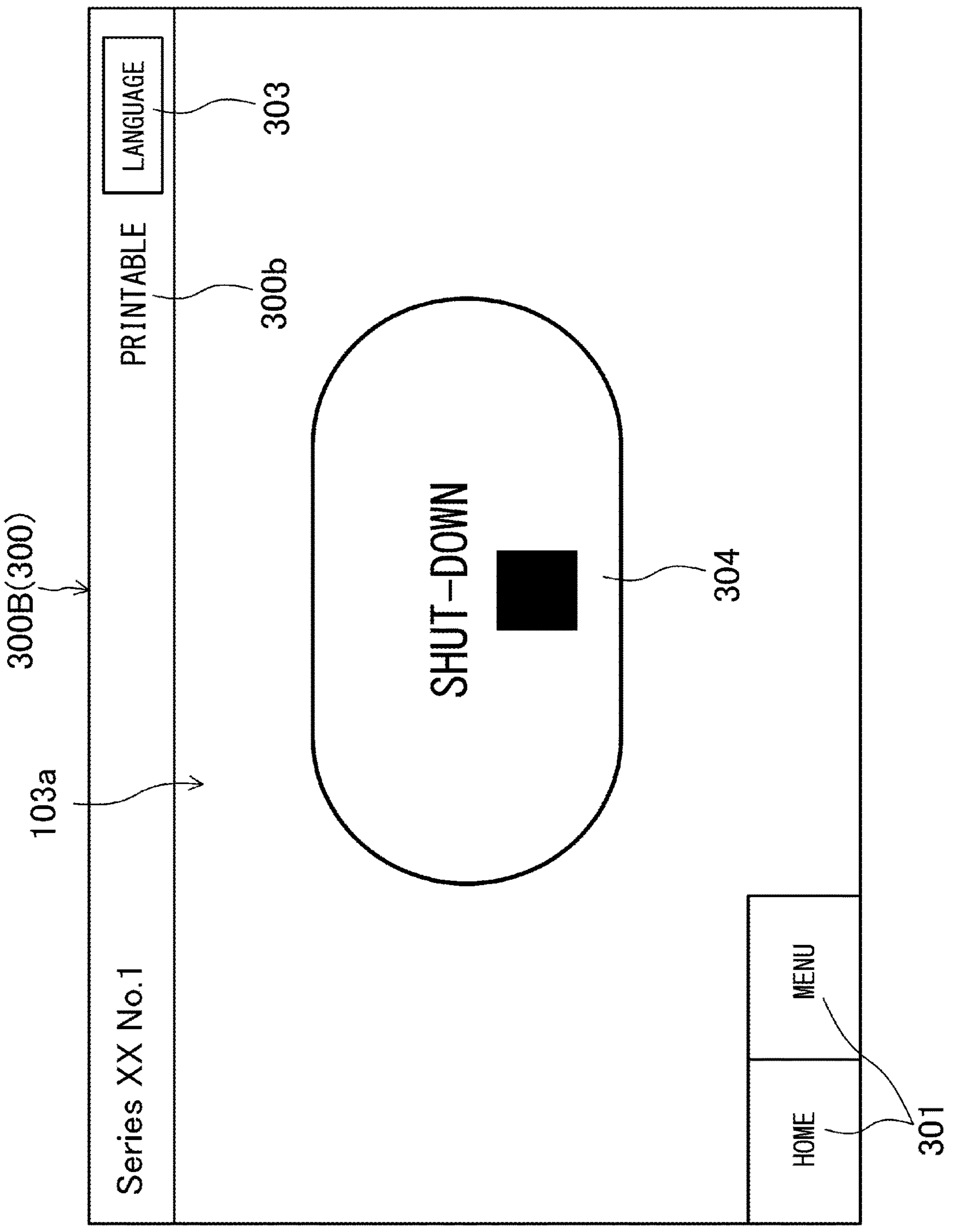
FIG. 8 is a diagram illustrating a display screen after the start-up processing.
Figure 9:
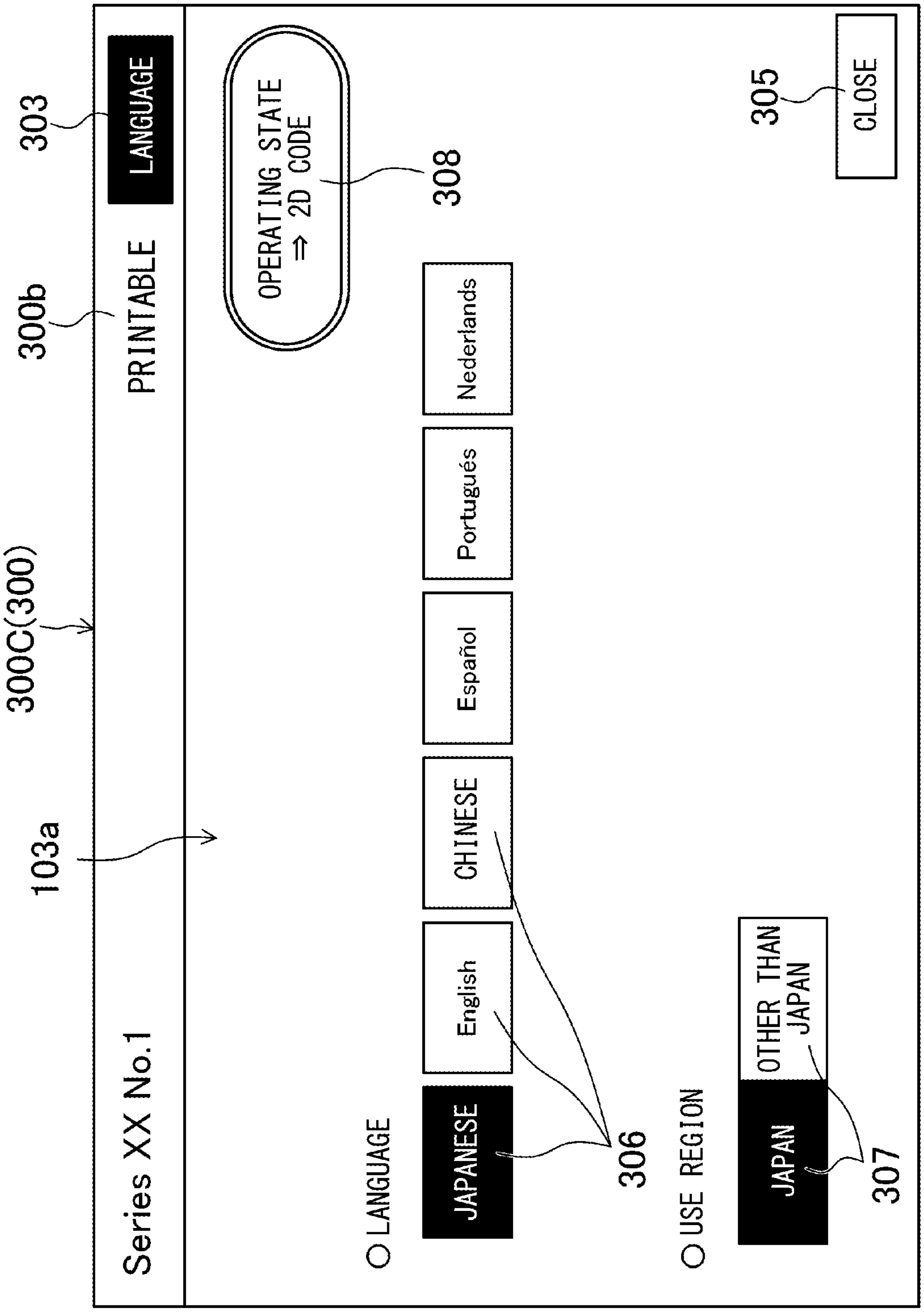
FIG. 9 is a diagram illustrating a layout of a mode transition button.
Figure 10:
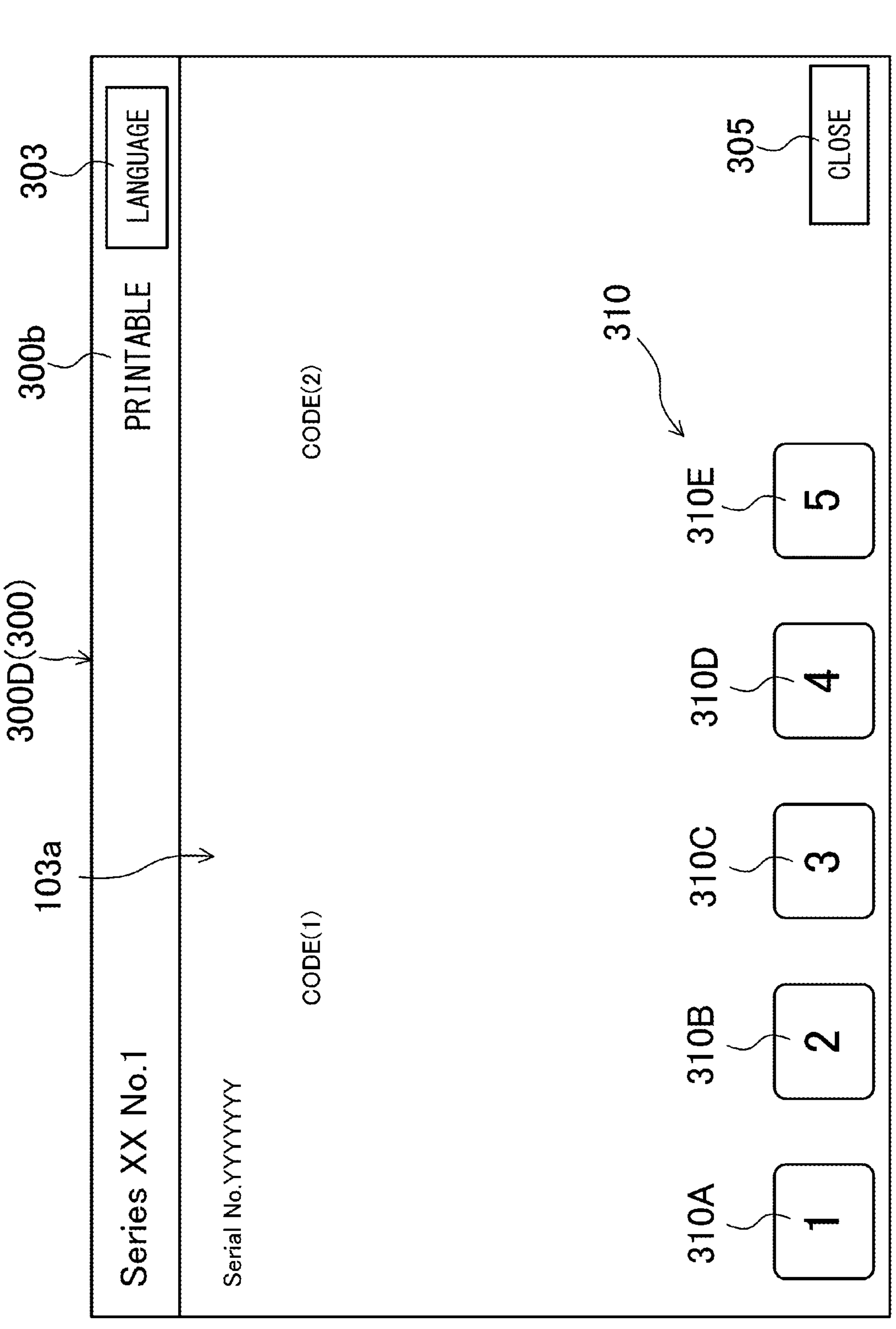
FIG. 10 is a diagram illustrating a layout of a plurality of objects.
Figure 12:
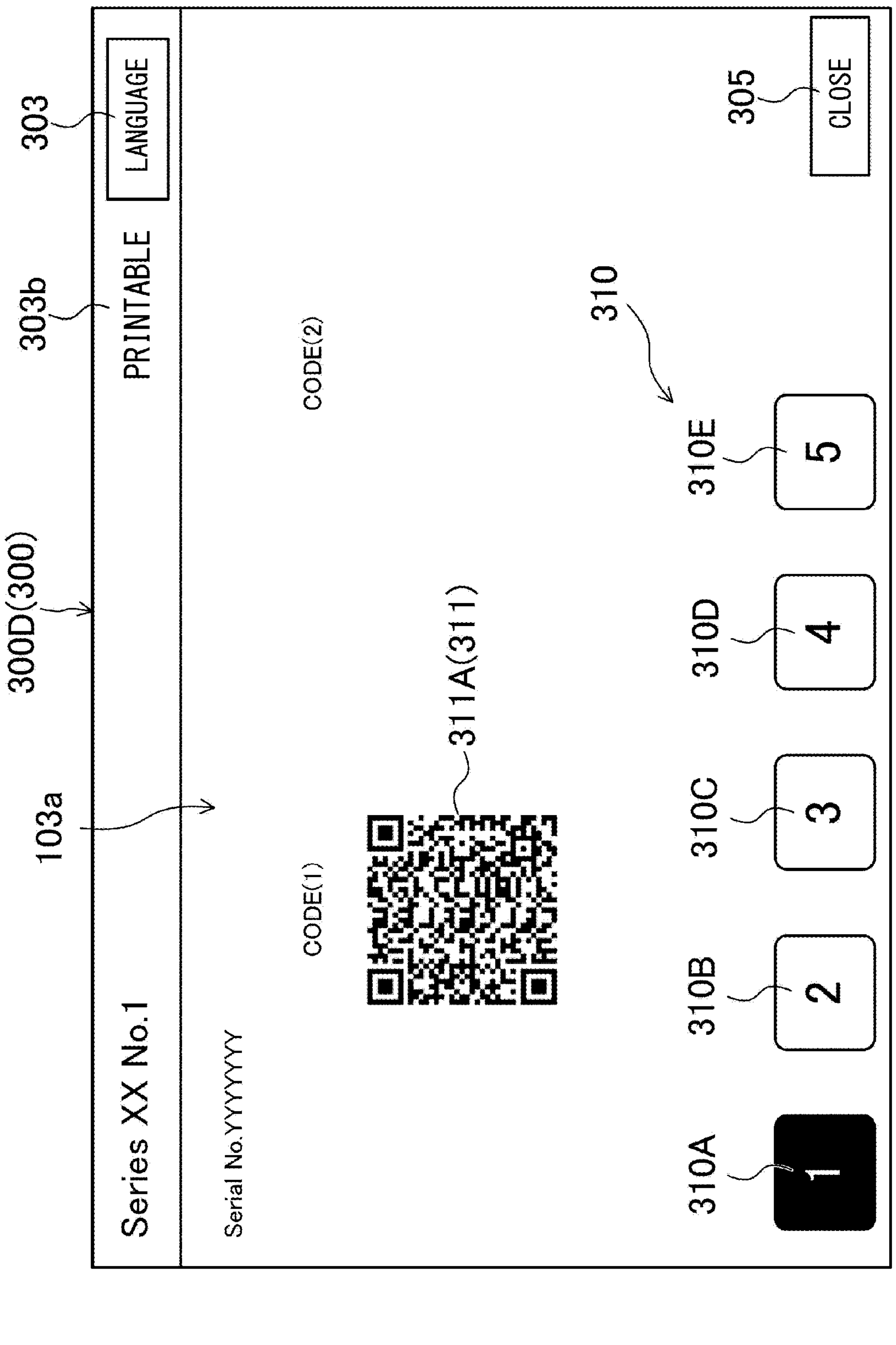
FIG. 12 is a diagram illustrating an example of a display aspect of the two-dimensional code.
Figure 13:
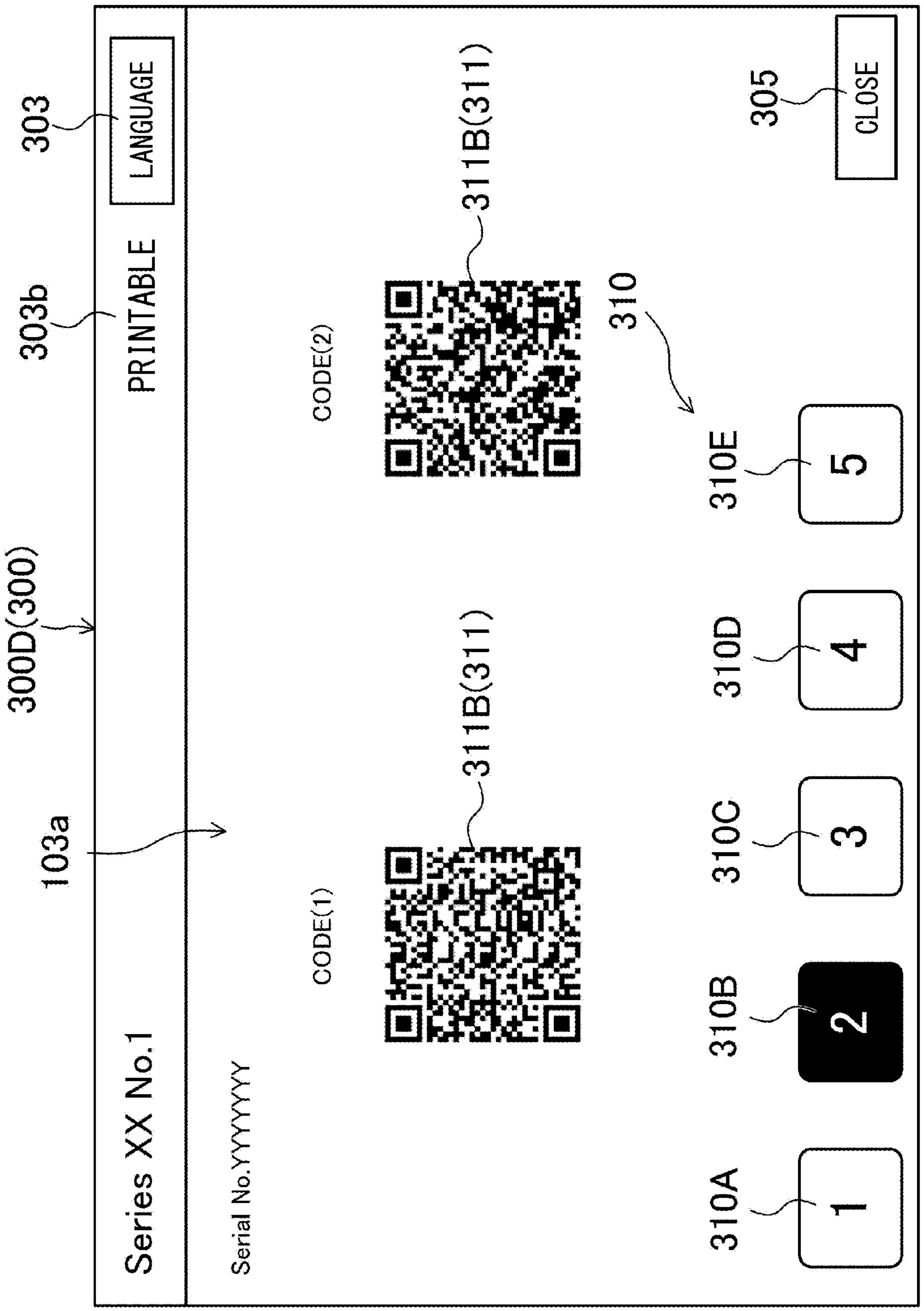
FIG. 13 is a diagram illustrating another example of the display aspect of the two-dimensional code.

In addition, FIG. 7 is a diagram illustrating a display screen (first screen 300A) related to the start-up processing. FIG. 8 is a diagram illustrating a display screen (second screen 300B) after the start-up processing. FIG. 9 is a diagram illustrating a layout of a mode transition button 308. FIG. 10 is a diagram illustrating a layout of the plurality of objects 310. FIG. 11A is a diagram illustrating the parameter set 202 associated with each object 310. FIG. 11B is a diagram illustrating the parameter set 202 associated with each object 310. FIG. 11C is a diagram illustrating the parameter values 201 related to the charge amount. FIG. 12 is a diagram illustrating an example of a display aspect of the two-dimensional code 311. FIG. 13 is a diagram illustrating another example of the display aspect of the two-dimensional code 311.

First, when the power is turned on to the inkjet recording device I, the display unit 103*a* displays, for example, the reception screen 300 as illustrated in FIG. 7. The reception screen 300 is the first screen 300A for receiving a command to execute the start-up processing.

As illustrated in FIG. 7, the display unit 103*a* displays, on the first screen 300A, a first GUI 301 that receives a command to execute screen switching, a second GUI 302 that receives a command to execute the start-up processing, a third GUI 303 that receives a command to switch the use language in the inkjet recording device I, and a first message 300*a* indicating that the inkjet recording device I is not in the printable state (is stopped).

When the second GUI 302 receives the command to execute the start-up processing via the operation unit 103*b*, the control unit 101 executes the above-described start-up processing (step SA1 in FIG. 5). When the start-up processing is completed, the ink circulates inside the print head 1 and the controller 100 (step SA2).

In addition, when the start-up processing is completed, the display unit 103*a* transitions the reception screen 300 from the first screen 300A illustrated in FIG. 7 to the second screen 300B illustrated in FIG. 8. The second screen 300B is a screen for receiving commands to execute the start-up processing and the shut-down processing.

As illustrated in FIG. 8, in addition to the first and third GUIs 301 and 303 described above, the display unit 103*a* displays, on the second screen 300B, a fourth GUI 304 that receives a command to execute the shut-down processing, and a second message 300*b* indicating that the inkjet recording device I is in the printable state.

Here, when the inkjet recording device I is in the printable state, and when the third GUI 303 on the second screen 300B is operated, the display unit 103*a* transitions the reception screen 300 from the second screen 300B in FIG. 8 to a third screen 300C illustrated in FIG. 9. The third screen 300C is a screen for receiving a command to switch the use language. Note that, the third screen 300C may be realized by being superimposed and displayed on the second screen 300B, or may be realized by changing a part of the content of the second screen 300B.

As illustrated in FIG. 8, the third screen 300C displays a fifth GUI 305 for closing the third screen 300C and returning to the second screen 300B, a sixth GUI 306 for receiving the selection of the use language, a seventh GUI 307 for receiving the selection of a use region of the inkjet recording device I, and a mode transition button 308 for starting the 2D code generation control.

The mode transition button 308 is a GUI configured to be pressed (for example, click operation) via the operation unit 103*b*. In step SA3 subsequent to step SA2 in FIG. 5, the control unit 101 determines whether or not the mode transition button 308 is pressed.

In a case where it is determined that the mode transition button 308 is pressed (step SA3: YES), the control unit 101 advances a control process from step SA3 to step SA4 in FIG. 5. On the other hand, in a case where it is determined that the mode transition button 308 is not pressed (step SA3: NO), the control unit 101 returns the control process from step SA3 to step SA2.

In step SA4, the control unit 101 acquires the parameter values 201 indicating the operating state of the inkjet recording device I via the sensors as the operating state acquisition unit. Here, a configuration example of the parameter value 201 indicating the operating state is as described with reference to FIG. 4A. In addition, the control unit 101 acquires not only the parameter values 201 constituting the specific parameter set 202 but also all the parameter values 201.

In addition, in step SA4, the control unit 101 acquires the most recent measured value (detected value) in addition to current measured values (detected values) of all the parameter values 201. The most recent measured value (detected value) refers to log data logged by the log data generation unit 101*g*. For example, as illustrated in a second row of FIG. 11B, the log data may be obtained by associating the corresponding parameter value 201 with an acquisition date and time (a data table in which the parameter values 201 are arranged in chronological order), or as illustrated in FIG. 11C, the log data may be obtained by performing statistical processing on a plurality of most recent acquired parameter values 201 (for example, a variance value indicating a variation in the parameter value 201).

The term "current" referred to herein refers to a timing at which the mode transition button 308 is pressed.

In subsequent step SA4, the display unit 103*a* transitions the reception screen 300 from the third screen 300C illustrated in FIG. 9 to the fourth screen 300D illustrated in FIG. 10. The fourth screen 300D is a screen for receiving the selection operation of the parameter set 202 described with reference to FIG. 4A and displaying the two-dimensional code 311 corresponding to the selected parameter set 202.

As illustrated in FIG. 10, the display unit 103*a* displays one or a plurality of objects 310 for giving a command to generate the two-dimensional code 311 on the fourth screen 300D. In the illustrated example, five objects 310 are displayed on the fourth screen 300D.

Hereinafter, five objects 310 are referred to as a first object 310A, a second object 310B, a third object 310C, a fourth object 310D, and a fifth object 310E in order from a left side of the screen. Each object 310 is also simply referred to as a "button".

These five objects 310 correspond to more specific examples of the object 310 schematically illustrated in FIG. 4A. That is, the storage unit 102 stores any one of five different parameter sets 202 (one of a first parameter set 202A to a fifth parameter set 202E) in association with each of five objects 310 for receiving a plurality of different generation commands from the user.

FIG. 11A illustrates the first parameter set 202A associated with the first object 310A, the second parameter set 202B associated with the second object 310B, and the third parameter set 202C associated with the third object 310C. As illustrated in FIG. 10, a first row of FIG. 11A indicates a number (that is, the type of the parameter set 202) for identifying each object 310, which is assigned to each of the first object 310A to the third object 310C. For example, a second row of FIG. 11A indicates information (purpose and details of the first parameter set 202A) related to the first object 310A and the first parameter set 202A.

FIG. 11B illustrates a fourth parameter set 202D associated with the fourth object 310D and a fifth parameter set 202E associated with the fifth object 310E. As illustrated in FIG. 10, a first row of FIG. 11B indicates a number for identifying each object 310, which is assigned to each of the fourth object 310D to the fifth object 310E. For example, a second row of FIG. 11B indicates information (purpose and details of the fourth parameter set 202D) related to the fourth object 310D and the fourth parameter set 202D.

The first parameter set 202A is a parameter set 202 related to an internal state of the inkjet recording device I, and is a parameter set 202 suitable for identifying a defect factor (a factor that a trouble occurs in printing) that is difficult to determine only by print quality. The first parameter set 202A is suitable for identifying a change in the internal state of the inkjet recording device I that has occurred in a relatively short period.

Specifically, as illustrated in FIG. 11A, the first parameter set 202A includes a combination of a data acquisition date and time, an internal tank level, a current operating state, a cumulative number of times of printing, a charge amount (current value) of ink particles, an ink charging phase (current value), a piezoelectric voltage (current value), an ink viscosity (current value), an ink temperature (current value), an ink pressure (current value), a charge amount (most recent log) of ink particles, an ink charging phase (most recent log), a piezoelectric voltage (most recent log), an ink viscosity (most recent log), an ink temperature (most recent log), and a gutter sensor measurement result (current value).

The first parameter set 202A also includes parameter values 201 omitted in the description made with reference to FIG. 4A, such as the data acquisition date and time and the internal tank level.

Here, the data acquisition date and time is an acquisition date and time of the parameter value 201. The internal tank level is a detection value of the accumulation sensor 106*a*. The current operating state is, for example, a flag indicating that the inkjet recording device is stopped, is performing the start-up processing, or is in the printable state.

The charging amount, the ink charging phase, the piezoelectric voltage, the ink viscosity, the ink temperature, and the ink pressure are as described with reference to FIG. 4A. In addition, the measurement result of the gutter sensor is the parameter value 201 indicating the recovery state of the gutter 16.

In addition, the "most recent log" referred to herein refers to a variance of the most recent parameter values 201 (for example, most recent 10 parameter values measured every 1 second) as illustrated in a lowermost row of the table illustrated in FIG. 11C. In the example illustrated in FIG. 11C, values of most recent 10 ink charging phases arranged in chronological order along a longitudinal direction of the paper surface and a value when a value of variance calculated based on the ink charging phase is bad and a value when the value of the variance is good are calculated.

Note that, a case where the value "when the value of the variance is bad" referred to herein corresponds to a case where "when the variance value of the phase is large". This corresponds to a case where an absolute value of the charge amount is small due to ink deterioration or the like, reproducibility of particle breakage when the ink is formed into the particles is bad, or the phase at which the charge amount is maximized is not stable due to disturbance such as vibration or the like. When the variance of the ink charging phase is bad, the charging phase of the ink particles to be actually ejected is not stable. These circumstances may cause printing disturbance.

On the other hand, a case where the value "when the value of the variance is good" referred to herein corresponds to a case where "when the variance value of the phase is small". This corresponds to a case where the charge amount can be stably measured, an S/N ratio is good, the reproducibility of the particle breakage when the ink is formed into the particles is good, there is no problematic vibration, and there is little noise. When the variation of the ink charging phase is good, stable printing is expected.

The second parameter set 202B is a parameter set 202 suitable for determining whether or not a decrease in solvent is appropriate, and is a parameter set 202 suitable for specifying whether or not there is a mistake in the operation of the inkjet recording device I such as solvent leakage.

Specifically, as illustrated in FIG. 11A, the second parameter set 202B is log data (cleaning history) obtained by associating a date and time (execution date and time) when each of the head cleaning (processing by the head cleaning control unit 101*b*), the nozzle cleaning (processing by the nozzle cleaning control unit 101*a*), the start-up processing, the shut-down processing, the adjustment of the solvent shaft, and the replacement of the solvent cartridge 51 is executed, the remaining amount of the solvent at the execution date and time, and the cumulative operating time of the pump 131, and logging the associated data in chronological order. Regarding the replacement of the solvent cartridge 51, not only the date and time when the replacement is performed but also the serial number of the solvent cartridge 51 after the replacement is logged.

The third parameter set 202C is a parameter set 202 suitable for determining whether or not various settings such as the print settings and the conveyance line of the printing object W are appropriate.

Specifically, as illustrated in FIG. 11A, the third parameter set 202C includes a set value indicating a printing direction of a character string to be printed, a set value indicating a conveyance speed of the conveyance line L, a set value of a print trigger (print start trigger) for controlling a print start timing for each printing object W, and a content of the character string to be printed in each printing object W.

The fourth parameter set 202D is a parameter set 202 suitable for determining whether or not the malfunction of the inkjet recording device I is due to the severity of the use environment of the device I.

Specifically, as illustrated in FIG. 11B, the fourth parameter set 202D is log data obtained by associating the ink pressure, the ink viscosity, the ambient temperature (environmental temperature), and the acquisition date and time of each parameter value 201 with each other and logging the associated data in chronological order.

The fifth parameter set 202E is a parameter set 202 related to the operation state of the inkjet recording device I, and is a parameter set 202 suitable for specifying the normal operation state of the device I.

Specifically, as illustrated in FIG. 11B, the fifth parameter set 202E is log data obtained by associating information indicating that maintenance is performed on the inkjet recording device I and details of the maintenance (for example, head cleaning, nozzle cleaning, start-up processing, shut-down processing, adjustment of solvent shaft, and adjustment of ink shaft) with the date and time when the maintenance is executed and logging the associated data in chronological order.

In addition, specifically, in addition to the data related to the maintenance, the fifth parameter set 202E is log data obtained by associating information indicating that an error occurs in the inkjet recording device I and details of the error (for example, an error indicating that the nozzle 11*b* is clogged and a leakage error in the deflection electrode 15) with the date and time when the error occurs and logging the associated data in chronological order.

As illustrated in FIG. 11B, the fifth parameter set 202E is log data obtained by collecting the log data related to the maintenance and the log data related to the error in chronological order.

Thereafter, the code generation unit 101*f* receives a command to generate the two-dimensional code 311 by receiving the selection of any one of the plurality of objects 310 via the reception screen 300.

Specifically, in step SA6 subsequent to step SA5, the code generation unit 101*f* determines whether or not one object 310 is selected. Here, in a case where it is determined that one object 310 is selected (step SA6: YES), the control unit 101 advances the control process from step SA6 to step SA7 in FIG. 5. On the other hand, in a case where it is determined that one object 310 is not selected (step SA6: NO), the control unit 101 causes the control process to remain at step SA6. That is, the control unit 101 repeats the determination in step SA6 until one object 310 is selected.

As described in subsequent steps SA7 and SA8, upon receiving the generation command, the code generation unit 101*f* generates the two-dimensional code 311 by encoding the parameter value 201 of the parameter set 202 stored in the storage unit 102 and associated with one object 310 selected via the reception screen 300.

Specifically, in step SA7, the code generation unit 101*f* determines the parameter set 202 associated with one object 310 selected in step SA6. In subsequent step SA8, the code generation unit 101*f* generates the two-dimensional code 311 by encoding the parameter value 201 of the parameter set 202 determined in step SA7.

At this time, the code generation unit 101*f* generates one or a plurality of two-dimensional codes 311 in accordance with the data amount of the parameter set 202 of the predefined type. Specifically, the code generation unit 101*f* generates one two-dimensional code 311 in a case where the data amount of the parameter set 202 is small, and generates two or more two-dimensional codes 311 as the data amount of the parameter set 202 increases.

Further, as described above with reference to FIG. 4A, the code generation unit 101*f* generates the two-dimensional code 311 by encoding the parameter value 201 constituting the parameter set 202 of the predefined type together with the access information 203 (for example, URL) for accessing a predetermined server (for example, the server 3001 in FIG. 14) on the Internet.

Thereafter, in step SA9 following step SA8, the display unit 103*a* displays the two-dimensional code 311 generated by the code generation unit 101*f*.

For example, FIG. 12 illustrates a case where the first object 310A is selected. In this case, the code generation unit 101*f* generates a first two-dimensional code 311A by encoding the parameter value 201 of the parameter set of the first type (first parameter set 202A) together with the access information 203. The display unit 103*a* displays the first two-dimensional code 311A generated in this manner on the fourth screen 300D.

In addition, FIG. 13 illustrates a case where the second object 310B is selected. In this case, the code generation unit 101*f* generates second two-dimensional codes 311B and 311B by encoding the parameter value 201 of the parameter set of the second type (second parameter set 202B) together with the access information 203. The server accessible by the access information 203 may be the same as in a case where the first object 310A is selected.

It is assumed that the data amount of the second parameter set 202B is larger than the data amount of the first parameter set 202A by a predetermined amount or more. In this case, as illustrated in FIG. 13, the code generation unit 101*f* generates two or more two-dimensional codes 311. The display unit 103*a* displays both of the generated two two-dimensional codes 311 on the fourth screen 300D.

Another Example of Two-Dimensional Code Generation Control

Note that, a flow illustrated in FIG. 5 is merely an example. For example, the flow may be modified as illustrated in FIG. 6. Here, steps SB1 to SB3 in FIG. 6 are substantially the same as steps SA1 to SA3 in FIG. 5, respectively. In addition, steps SB4 to SB5 in FIG. 6 are the same as steps SA5 to SA6 in FIG. 5, respectively, and steps SB7 to SB9 in FIG. 6 are the same as steps SA7 to SA9 in FIG. 5, respectively.

As can be seen from the comparison between step SB6 in FIG. 6 and step SA4 in FIG. 5, a difference between FIG. 5 and FIG. 6 is only an acquisition timing of the parameter value 201.

That is, in step SB6 in FIG. 6, the control unit 101 acquires the parameter value 201 indicating the operating state of the inkjet recording device I via the sensors as the operating state acquisition unit. Here, a configuration example of the parameter value 201 indicating the operating state is similar to the description according to FIG. 5. In addition, the control unit 101 acquires not only the parameter values 201 constituting the specific parameter set 202 but also all the parameter values 201.

In addition, in step SB6, the control unit 101 acquires the most recent measured value (detected value) in addition to the current measured values (detected values) of all the parameter values 201. Then, the "current time" referred to herein is not a timing when the mode transition button 308 is pressed as in the flow according to FIG. 5, but a timing when one object 310 is selected in immediately preceding step SB5.

Note that, some of the parameter values 201 may be acquired by the operating state acquisition unit at the timing when the mode transition button 308 is pressed, and the other parameter values 201 may be acquired by the operating state acquisition unit at the timing when one object 310 is selected.

Significance of Two-Dimensional Code Generation Control

As described above, according to the present embodiment, the user can easily acquire the internal data of the inkjet recording device I only by giving the generation command of the two-dimensional code 311 on the reception screen 300 (for example, operating the GUI on the screen) as illustrated in FIGS. 4A and 10 and the like without executing a complicated operation.

In addition, the internal data of the inkjet recording device I can be transmitted only by capturing the two-dimensional code 311 with a smartphone or the like and sending the captured content to the support center through an e-mail or the like without directly connecting a USB memory, an external network, or the like to the inkjet recording device I. As a result, it is possible to achieve both security and usability improvement.

In particular, since not all the parameter values 201 but the parameter value 201 of the "parameter set 202 of the predefined type" are encoded, internal data contributing to trouble resolving can be easily acquired, and it is advantageous for improvement in usability.

In addition, as illustrated in FIG. 4A and the like, the inkjet recording device I according to the present embodiment encodes the parameter value 201 constituting the parameter set 202 of the predefined type together with the access information 203 for accessing a predetermined server on the Internet. As a result, the user can transmit the internal data (parameter value 201) to a predetermined server by capturing and decoding the two-dimensional code 311 by using a portable communication terminal such as a smartphone and accessing the predetermined server by using the access information 203 (for example, URL) acquired by the decoding without executing a complicated operation. This is effective in easily acquiring the internal data contributing to the trouble resolving and improving the usability of the inkjet recording device I.

In addition, since not all the parameter values 201 but the parameter value 201 of the "parameter set 202 of the predefined type" are narrowed down and encoded at the time of transmitting the internal data (parameter value 201), it is advantageous in keeping the total data amount of the parameter value 201 within the data amount limit (for example, 255 characters) of the URL used for communication in the portable communication terminal.

As a result, the internal data contributing to trouble resolving can be easily sent to the predetermined server. This contributes to improvement in usability.

In addition, as illustrated in FIGS. 4A, 10, 11A, 11B, and the like, the inkjet recording device I according to the present embodiment stores any one of the plurality of different parameter sets 202 in association with each of the plurality of objects 310 for receiving the plurality of different generation commands from the user. As a result, for example, the parameter set 202 is defined in advance in accordance with a type of the assumed trouble, and thus, more appropriate internal data (useful for resolving the trouble) can be more easily acquired in accordance with the content of the occurred trouble.

In addition, as illustrated in FIGS. 4A, 11A, 11B, and the like, it is possible to determine a temporal change or the like of the parameter value 201 by including the log data in the parameter value 201. As a result, it is advantageous for resolving the trouble.

In addition, as illustrated in FIGS. 4A, 11A, 11B, and the like, it is possible to cope with the trouble specific to the inkjet recording device I by including the supply state of the solvent in the operating state. As a result, it is advantageous for resolving the trouble.

In addition, as illustrated in FIGS. 4A, 11A, 11B, and the like, it is possible to cope with the trouble specific to the inkjet recording device I by including the remaining amount of the solvent and the operating state of the pump 131 in the operating state. As a result, it is advantageous for resolving the trouble.

In addition, as illustrated in FIGS. 4A, 11A, 11B, and the like, it is possible to cope with the trouble specific to the inkjet recording device I by including the solvent supply state and the cleaning history of the cleaning operation unit in the operating state. As a result, it is advantageous for resolving the trouble.

In addition, as illustrated in FIGS. 4A, 11A, 11B, and the like, it is possible to cope with the trouble specific to the inkjet recording device I by including the viscosity of the ink in the ink tank 106 in the operating state. As a result, it is advantageous for resolving the trouble.

In addition, as illustrated in FIGS. 4A, 11A, 11B, and the like, it is possible to cope with the trouble specific to the inkjet recording device I by including the viscosity of the ink in the ink tank 106 in the operating state. As a result, it is advantageous for resolving the trouble.

In addition, as illustrated in FIG. 13, two or more two-dimensional codes 311 are generated in accordance with the data amount of the parameter set 202, and thus, the two-dimensional code 311 can be generated without delay even in a case where the data amount is relatively large. As a result, it is advantageous in easily acquiring the internal data contributing to the trouble resolving and improving the usability of the inkjet recording device I.

Application Example to Data Transfer System T

Figure 14:
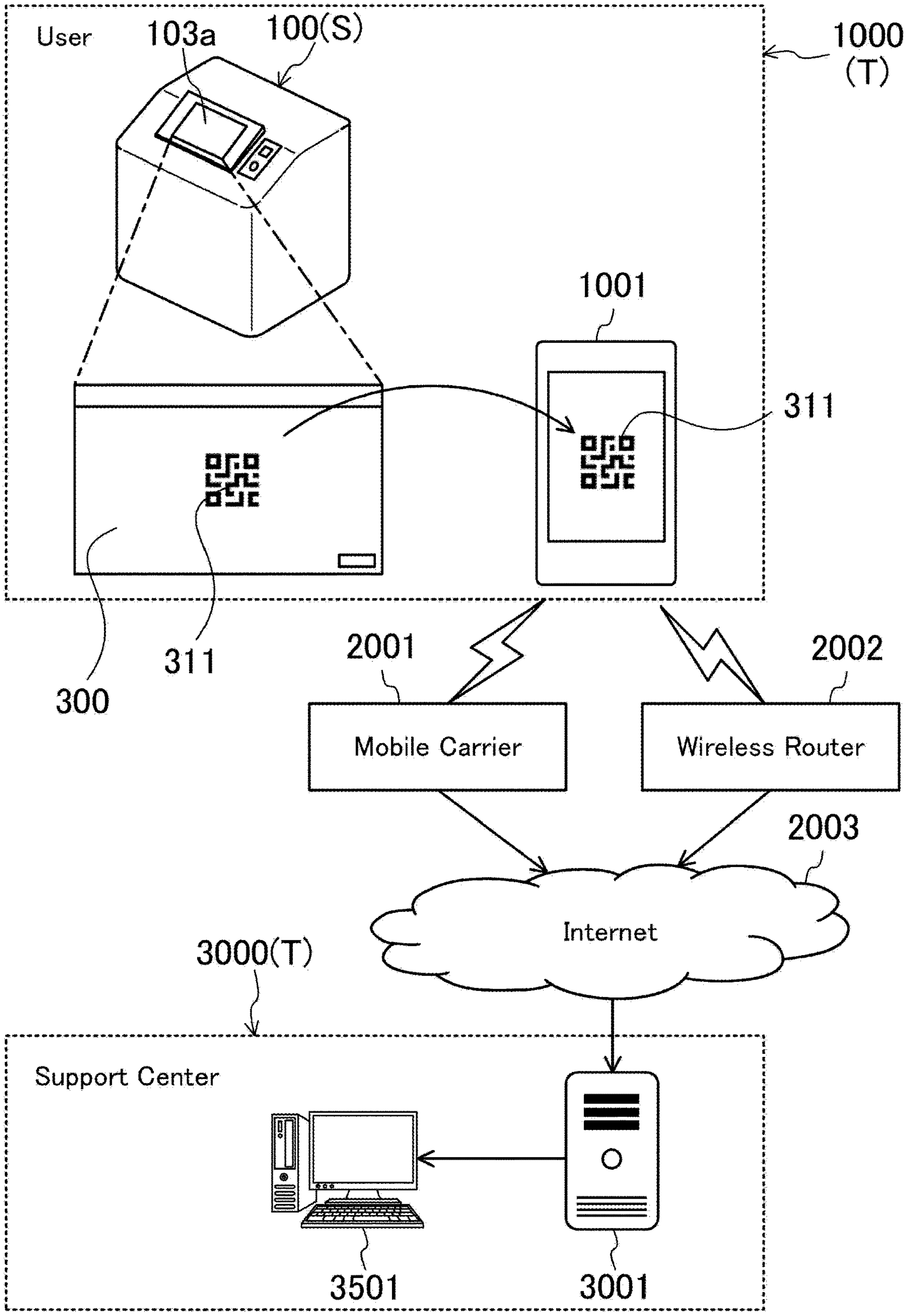
FIG. 14 is a diagram illustrating an overall configuration of a data transfer system.
Figure 15:
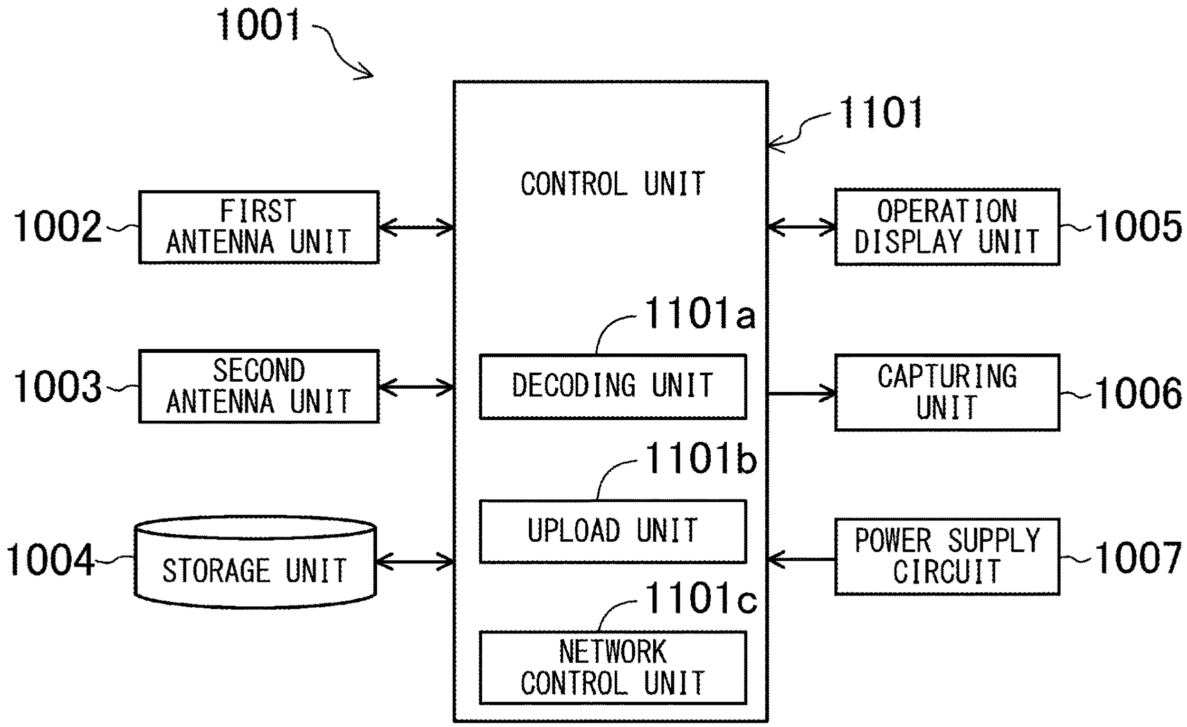
FIG. 15 is a block diagram illustrating a schematic configuration of a portable communication terminal in the data transfer system.
Figure 16:
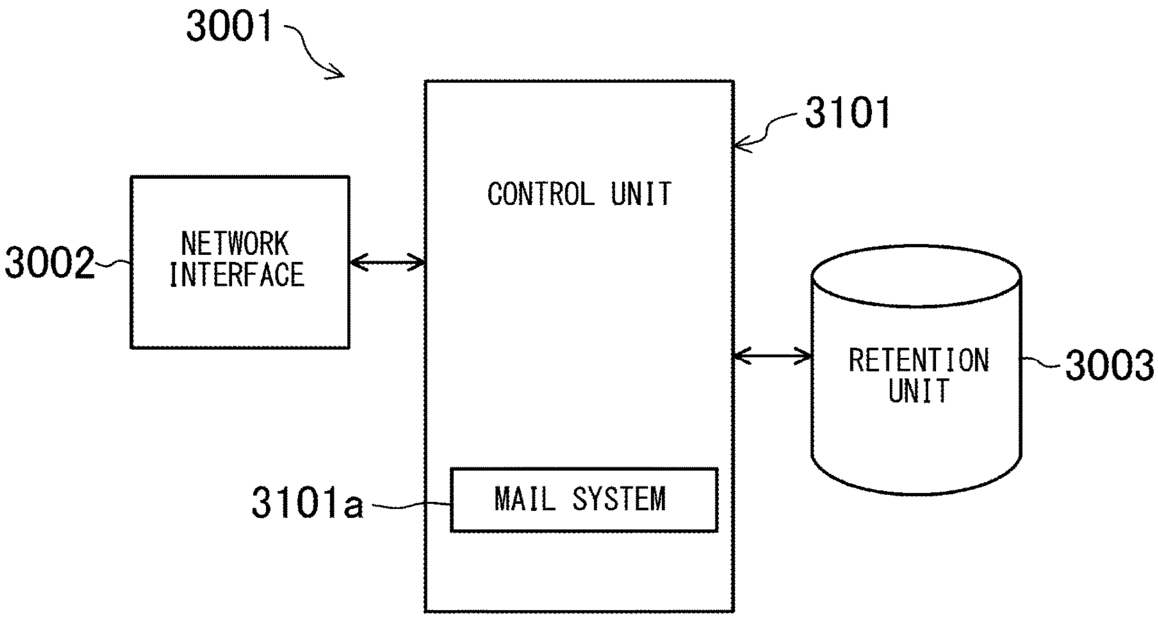
FIG. 16 is a block diagram illustrating a schematic configuration of a server in the data transfer system.
Figure 17:
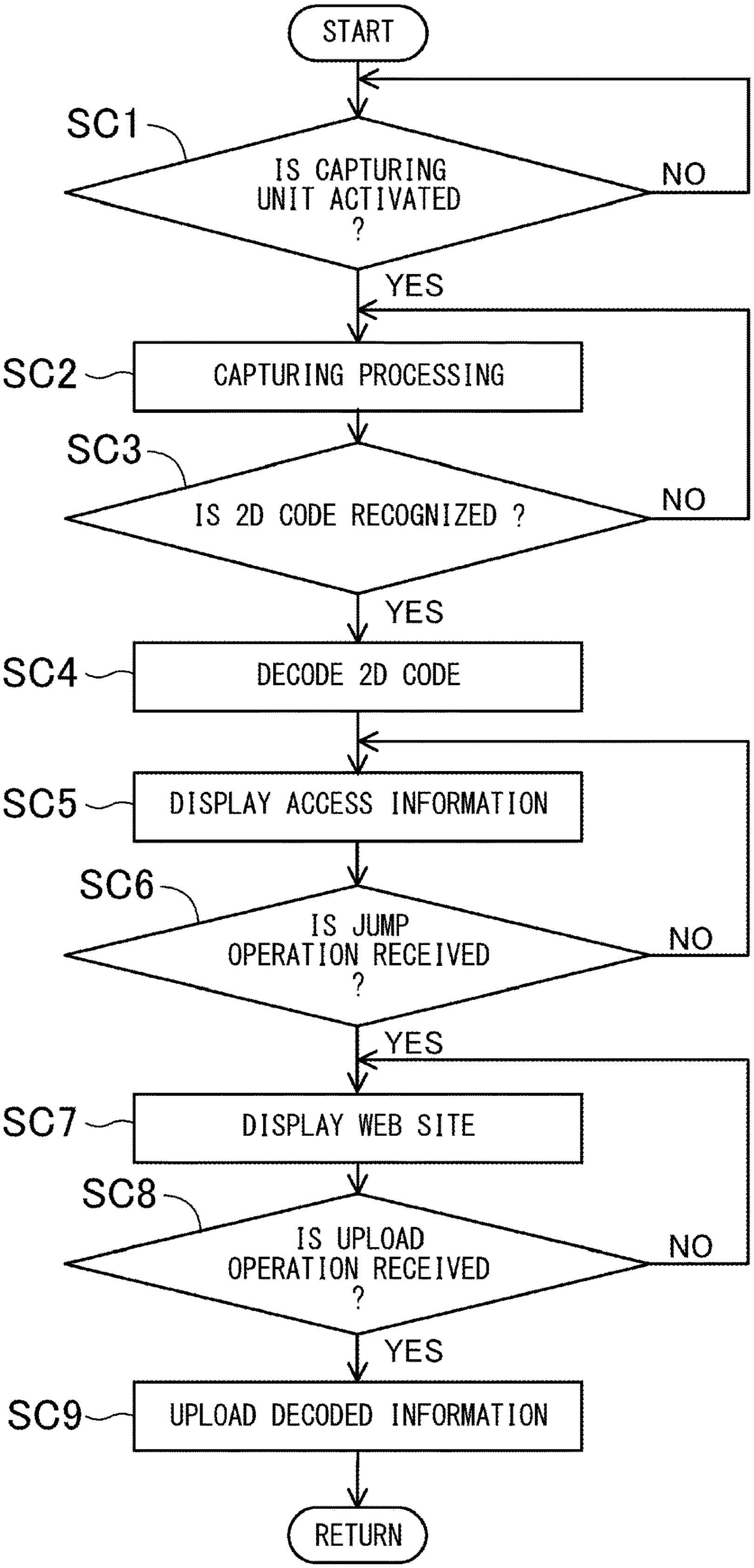
FIG. 17 is a flowchart illustrating processing performed by the portable communication terminal in the data transfer system.
Figure 18:
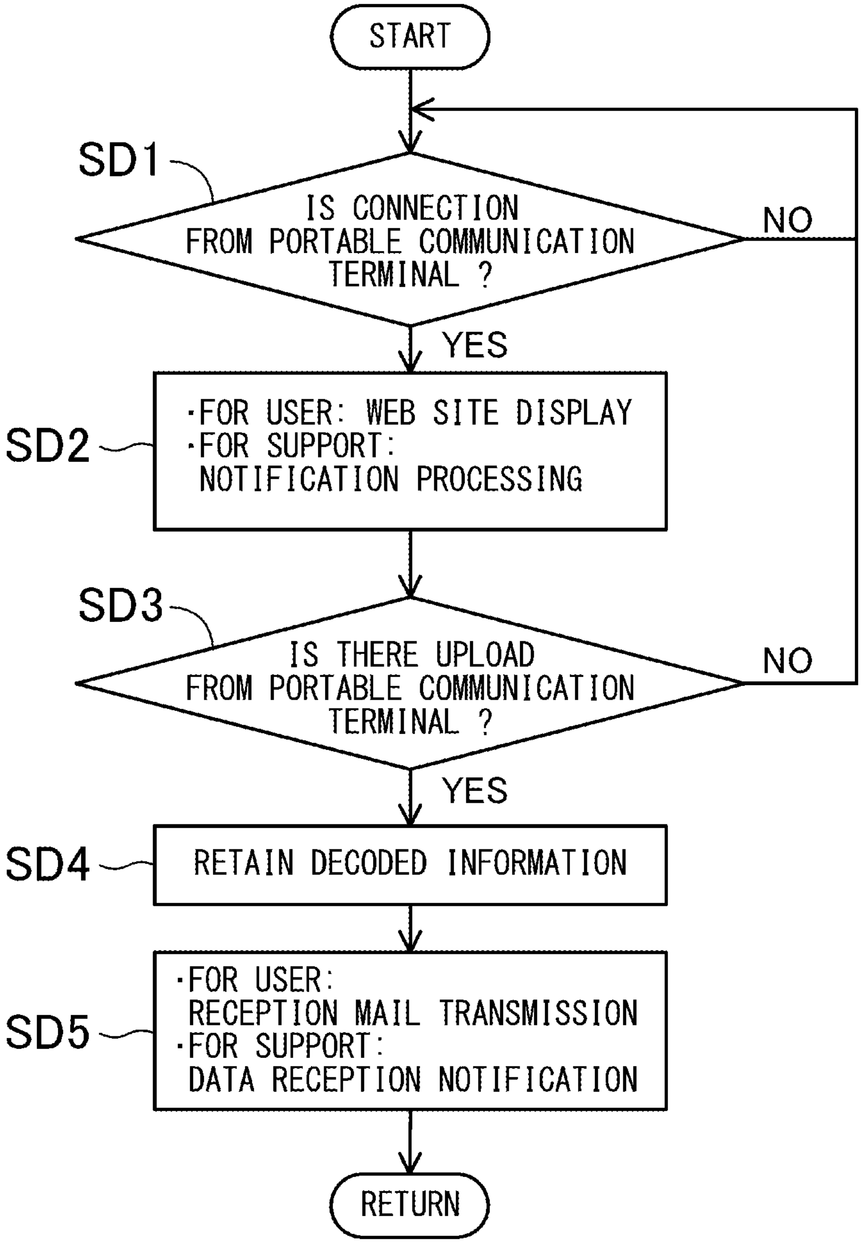
FIG. 18 is a flowchart illustrating processing performed by the server in the data transfer system.

FIG. 14 is a diagram illustrating an overall configuration of the data transfer system T. FIG. 15 is a block diagram illustrating a schematic configuration of a portable communication terminal 1001 in the data transfer system T. FIG. 16 is a block diagram illustrating a schematic configuration of the server 3001 in the data transfer system T. FIG. 17 is a flowchart illustrating processing performed by the portable communication terminal in the data transfer system T. FIG. 18 is a flowchart illustrating processing performed by the server 3001 in the data transfer system T.

As illustrated in FIG. 14, the data transfer system T includes, for example, a user-side system 1000 and a support-side system 3000. Both the systems 1000 and 3000 are capable of communicating via a mobile carrier 2001, a wireless router 2002, and the Internet 2003.

Note that, the data transfer system T is intentionally configured to realize one-way communication of transmitting information from the inkjet recording device I to the support-side system 3000 via the portable communication terminal 1001, instead of two-way communication.

Here, the user-side system 1000 includes the inkjet recording device I illustrated in FIGS. 1 to 13 and the like, and the portable communication terminal 1001. The support-side system 3000 includes the server 3001 connected to the portable communication terminal 1001 via the Internet 2003, and a support terminal 3501.

The data transfer system T illustrated in FIG. 14 is configured to transfer the operating state of the inkjet recording device I acquired by the operating state acquisition unit to the server 3001 via the portable communication terminal 1001.

Here, as already described with reference to FIG. 4A and the like, the code generation unit 101*f* of the inkjet recording device I generates the two-dimensional code 311 by encoding the parameter value 201 constituting the parameter set 202 of the predefined type together with the access information 203 for accessing the server 3001.

(Portable Communication Terminal 1001)

The portable communication terminal 1001 is, for example, a smartphone. As illustrated in FIG. 15, the portable communication terminal 1001 includes a first antenna unit 1002, a second antenna unit 1003, a storage unit 1004, an operation display unit 1005, a capturing unit 1006, a power supply circuit 1007, and a control unit 1101.

The first antenna unit 1002 is an antenna for being connected to the Internet 2003 via the mobile carrier 2001. The first antenna unit 1002 is an antenna for communicating with the Internet 2003 via the wireless router 2002.

The storage unit 1004 is, for example, a nonvolatile memory. The operation display unit 1005 is a so-called touch screen (also referred to as a touch panel). The capturing unit 1006 is a so-called camera. The capturing unit 1006 can capture the two-dimensional code 311 displayed on the display unit 103*a* of the inkjet recording device I and also encoded together with the access information 203.

The power supply circuit 1007 is, for example, a lithium ion battery.

The control unit 1101 includes a CPU, a volatile memory, and an input and output bus. The control unit 1101 includes a decoding unit 1101*a*, an upload unit 1101*b*, and a network control unit 1101*c*.

The decoding unit 1101*a* acquires the operating state of the inkjet recording device I corresponding to the two-dimensional code 311 and the access information 203 by decoding the two-dimensional code 311 captured by the capturing unit 1006. The decoding unit 1101*a* acquires, for example, a character string in a URL format. The access information 203 and the operating state can be simultaneously acquired by including the parameter indicating the operating state in the character string in the URL format.

The upload unit 1101*b* uploads the operating state acquired by the decoding unit 1101*a* to the server 3001 specified by the access information 203.

The network control unit 1101*c* controls Internet communication via the first antenna unit 1002 or the second antenna unit 1003.

(Server 3001)

For example, as illustrated in FIG. 16, the server 3001 includes a network interface 3002, a retention unit 3003, and a control unit 3101.

The network interface 3002 controls information communication between portable communication terminal 1001 and support terminal 3501. The retention unit 3003 is, for example, a nonvolatile memory. The retention unit 3003 retains the operating state uploaded by the upload unit 1101*b* of the portable communication terminal 1001. In this retention, the retention unit 3003 may retain the serial number of the inkjet recording device I in association with the operating state.

The control unit 3101 includes a CPU, a volatile memory, and an input and output bus. The control unit 3101 includes a mail system 3101*a*.

The mail system 3101*a* is a system for transmitting and receiving mails to and from the support terminal 3501. The support terminal 3501 may be, for example, a so-called personal computer.

(Specific Example of Data Transfer Method)

Next, a data transfer method executed by the data transfer system T will be described with reference to FIGS. 17 and 18.

Although not illustrated, prior to a flow of FIG. 17, the code generation unit 101*f* of the inkjet recording device I generates the two-dimensional code 311 by encoding the parameter value 201 constituting the parameter set 202 of the predefined type together with the access information 203 for accessing the server 3001 (sec FIGS. 4A, 5, 6, and the like).

Subsequently, in step SC1 in FIG. 17, the control unit 1101 of the portable communication terminal 1001 determines whether or not the capturing unit 1006 of the terminal 1001 is activated. This determination is made until the capturing unit 1006 is activated (until the determination in step SC1 becomes YES). When the capturing unit 1006 is activated, the control process proceeds to step SC2.

In step SC2, the portable communication terminal 1001 captures the two-dimensional code 311 displayed on the display unit 103*a* of the inkjet recording device I and also encoded together with the access information 203 (capturing processing).

Subsequently, in step SC3, the portable communication terminal 1001 decoding unit 1101*a* determines whether or not the two-dimensional code 311 captured in step SC2 is recognized (whether or not decoding can be performed). In a case where the determination is NO, the control process returns to step SC2. On the other hand, in a case where the determination in step SC3 is YES, the control process proceeds to step SC4.

Subsequently, in step SC4, the decoding unit 1101*a* of the portable communication terminal 1001 acquires the operating state of the inkjet recording device I corresponding to the two-dimensional code 311 and the access information 203 by decoding the captured two-dimensional code 311.

Subsequently, in step SC5, the network control unit 1101*c* of the portable communication terminal 1001 displays the access information 203 in the URL format, for example, on the operation display unit 1005. The operation display unit 1005 can jump to a WEB site corresponding to access information 203 by receiving a predetermined operation input (jump operation).

Subsequently, in step SC6, the network control unit 1101*c* of the portable communication terminal 1001 determines whether or not the jump operation to the WEB site is received (is jump operation accepted?). In a case where the determination is NO, the control process returns to step SC5. On the other hand, in a case where the determination in step SC6 is YES, the control process proceeds to step SC7.

Subsequently, in step SC7, the network control unit 1101*c* of the portable communication terminal 1001 displays the WEB site on the operation display unit 1005 through a WEB browser.

Subsequently, in step SC8, it is determined whether or not the upload unit 1101*b* of the portable communication terminal 1001 receives an operation for instructing the upload of the operating state (is upload operation received?). In a case where the determination is NO, the control process returns to step SC7. On the other hand, in a case where the determination in step SC6 is YES, the control process proceeds to step SC9.

Subsequently, in step SC9, the upload unit 1101*b* of the portable communication terminal 1001 uploads the operating state acquired by the decoding unit 1101*a* decoding the two-dimensional code 311 to the server 3001 specified by the access information 203.

When this step is completed, all the types of processing on the portable communication terminal 1001 side are completed.

On the other hand, on the server 3001 side, in step SD1 in FIG. 18, it is determined whether or not the network interface 3002 of the server 3001 is network-connected from the portable communication terminal 1001. This determination is YES, for example, when the portable communication terminal 1001 receives the jump operation in step SC6 (when an instruction to open the WEB site is received). This determination is made until the portable communication terminal 1001 is network-connected (until the determination in step SD1 becomes YES). When the portable communication terminal 1001 is network-connected, the control process proceeds to step SD2.

In subsequent step SD2, the server 3001 performs notification processing (processing for notifying that the server is network-connected from the portable communication terminal 1001) on the support terminal 3501, while the above-described WEB site is displayed on the portable communication terminal 1001 of the user.

In subsequent step SD3, the server 3001 determines whether or not the above-described operating state is uploaded from the upload unit 1101*b* of the portable communication terminal 1001. In a case where this determination is NO, the control process returns to step SD1. On the other hand, in a case where the determination in step SD3 is YES, the control process proceeds to step SD4.

In subsequent step SD4, the retention unit 3003 of the server 3001 retains the operating state uploaded by the upload unit 1101*b* of the portable communication terminal 1001.

In subsequent step SD5, the server 3001 notifies the support terminal 3501 that the operating state is received and saved (data reception notification). The server 3001 transmits a reception mail indicating that the operating state is retained to the portable communication terminal 1001 of the user through the mail system 3101*a*.

(Significance of Data Transfer System T)

As described above, the user can easily acquire the internal data of the inkjet recording device I only by giving a command to generating the two-dimensional code 311 on the reception screen 300 (for example, the GUI on the screen is operated) as illustrated in FIG. 14 and the like without executing a complicated operation.

In addition, the internal data of the inkjet recording device I can be transmitted only by capturing the two-dimensional code 311 with a smartphone or the like and sending the captured content to the support center through an e-mail or the like without directly connecting a USB memory, an external network, or the like to the inkjet recording device I. As a result, it is possible to achieve both security and usability improvement.

In particular, since not all the parameter values but the parameter value of the "parameter set of the predefined type" are encoded, internal data contributing to the trouble resolving can be easily acquired, and it is advantageous for improvement in usability.

In addition, the inkjet recording device I according to the present embodiment encodes the parameter value 201 constituting the parameter set 202 of the predefined type together with the access information 203 for accessing a predetermined server on the Internet. As a result, the user can transmit the internal data (parameter value 201) to the predetermined server 3001 by capturing and decoding the two-dimensional code 311 by using the portable communication terminal 1001 such as a smartphone and accessing the predetermined server 3001 by using the access information 203 (for example, URL) acquired by the decoding without executing a complicated operation. This is effective in easily acquiring the internal data contributing to the trouble resolving and improving the usability of the inkjet recording device I.

In addition, since not all the parameter values 201 but the parameter value 201 of the "parameter set 202 of the predefined type" are narrowed down and encoded at the time of transmitting the internal data (parameter value 201), it is advantageous in keeping the total data amount of the parameter value 201 within the data amount limit (for example, 255 characters) of the URL used for communication in the portable communication terminal 1001. As a result, it is possible to easily send the internal data contributing to the trouble resolving to the predetermined server 3001. This contributes to improvement in usability.

As described above, the data transfer system T and the data transfer method can cause the server 3001 to easily acquire the internal data contributing to the trouble resolving without impairing the security. This is effective for improving usability.

What is claimed is:

1. An inkjet recording device comprising:
an ink tank that stores ink;
an ejection mechanism that pressurizes ink sent out from the ink tank to form the ink into particulate ink, and ejects the particulate ink;
a charging electrode that charges the particulate ink ejected by the ejection mechanism;
a deflection electrode that deflects a flying direction of the ink charged by the charging electrode; and
a gutter that recovers the ink not deflected by the deflection electrode,
wherein printing is performed by causing the ink deflected by the deflection electrode to land on a workpiece,
the inkjet recording device further includes
an operating state acquisition unit that acquires parameter values indicating an operating state of the inkjet recording device, which includes at least one of a pressurization state in the ejection mechanism, a charge state in the charging electrode, a deflection state in the deflection electrode, and/or a recovery state of the gutter,
a storage unit that stores a plurality of different parameter sets, wherein each of the plurality of different parameter sets is defined in accordance with respective type of assumed trouble and includes parameter values of predetermined types acquired by the operating state acquisition unit,
a display unit that displays a reception screen for receiving a command to generate a two-dimensional code decodable by a portable communication terminal from a user, and
a code generation unit that generates, in response to the receipt of the generation command via the reception screen of the display unit, the two-dimensional code associated with any one of the parameter sets stored in the storage unit by encoding parameter values constituting the one of the parameter sets,
wherein the display unit is configured to display the two-dimensional code generated by the code generation unit.

2. The inkjet recording device according to claim 1, wherein the code generation unit generates the two-dimensional code by encoding the parameter value constituting the parameter set of the predefined type together with access information for accessing a predetermined server on the Internet.

3. The inkjet recording device according to claim 1,
wherein the storage unit stores any one of the plurality of different parameter sets in association with each of a plurality of objects for receiving a plurality of different generation commands from the user,
wherein the display unit displays the plurality of objects on the reception screen, and
the code generation unit
receives the generation command by receiving selection of any one of the plurality of objects via the reception screen, and
generates, in response to the receipt of the generation command, the two-dimensional code by encoding parameter values of the parameter set corresponding to one object stored in the storage unit and selected via the reception screen.

4. The inkjet recording device according to claim 1, further comprising a log data generation unit that generates log data by logging the parameter values indicating the operating state of the inkjet recording device in chronical order,
wherein the code generation unit includes the log data generated by the log data generation unit in the parameter value constituting the parameter set of the predefined type.

5. The inkjet recording device according to claim 1, further comprising a solvent supply unit that supplies a solvent to the ink tank,
wherein the operating state of the inkjet recording device further includes a supply state in the solvent supply unit.

6. The inkjet recording device according to claim 5, wherein
the solvent supply unit includes
a housing member that houses a solvent,
a supply path that connects the housing member and the ink tank to supply the solvent to the ink tank from the housing member, and
a pump that is disposed in the middle of the supply path to send the solvent within the housing member to the ink tank, and
the supply state in the solvent supply unit includes a remaining amount of the solvent in the housing member and an operating state of the pump.

7. The inkjet recording device according to claim 1, further comprising:
a solvent supply unit that supplies a solvent to the ink tank; and
a cleaning operation unit that cleans the ejection mechanism by the solvent supplied from the solvent supply unit, wherein the operating state of the inkjet recording device further includes a supply state in the solvent supply unit and a cleaning history of the cleaning operation unit.

8. The inkjet recording device according to claim 1, further comprising:

a solvent supply unit that supplies a solvent to the ink tank; and a viscosity measurement unit that measures a viscosity of the ink within the ink tank, wherein the operating state of the inkjet recording device includes the viscosity of the ink measured by the viscosity measurement unit.

9. The inkjet recording device according to claim 1, further comprising a temperature measurement unit that measures a temperature of the ink within the ink tank, wherein the operating state of the inkjet recording device includes the temperature of the ink measured by the temperature measurement unit.

10. The inkjet recording device according to claim 1, wherein the code generation unit generates one or a plurality of two-dimensional codes in accordance with a data amount of the parameter set of the predefined type.

11. A data transfer system comprising:

the inkjet recording device according to claim 1, a portable communication terminal; and a server that is connected to the portable communication terminal via the Internet, wherein an operating state of the inkjet recording device acquired by the operating state acquisition unit is transferred to the server via the portable communication terminal, the code generation unit of the inkjet recording device generates a two-dimensional code by encoding a parameter value constituting the parameter set of the predefined type together with access information for accessing the server, the portable communication terminal includes a capturing unit that captures the two-dimensional code displayed on the display unit of the inkjet recording device and encoded together with the access information, a decoding unit that acquires the operating state of the inkjet recording device corresponding to the two-dimensional code by decoding the two-dimensional code captured by the capturing unit, and an upload unit that uploads the operating state acquired by the decoding unit to the server specified by the access information, and the server includes a retention unit that retains the operating state uploaded by the upload unit.

12. A data transfer method for transferring, to a server connected to a portable communication terminal via the Internet, an operating state of the inkjet recording device according to claim 1, which is acquired by the operating state acquisition unit, via the portable communication terminal by using the inkjet recording device, the portable communication terminal, and the server, the method comprising:

a step of generating, by the code generation unit of the inkjet recording device, a two-dimensional code by encoding a parameter value constituting the parameter set of the predefined type together with access information for accessing the server;

a step of capturing, by the portable communication terminal, the two-dimensional code displayed on the display unit of the inkjet recording device and encoded together with the access information;

a step of acquiring, by the portable communication terminal, the operating state of the inkjet recording device corresponding to the two-dimensional code by decoding the captured two-dimensional code;

a step of uploading, by the portable communication terminal, the operating state acquired by decoding the two-dimensional code to the server specified by the access information; and a step of retaining, by the server, the operating state uploaded by the portable communication terminal.

* * * * *